US006573493B1

(12) United States Patent
Futami et al.

(10) Patent No.: US 6,573,493 B1
(45) Date of Patent: Jun. 3, 2003

(54) METHOD AND APPARATUS FOR LASER ANALYSIS OF DIOXINS

(75) Inventors: Hiroshi Futami, Yokohama (JP); Yasuhiro Takatsudo, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 128 days.

(21) Appl. No.: 09/696,005

(22) Filed: Oct. 26, 2000

(30) Foreign Application Priority Data

Oct. 26, 1999 (JP) .......................................... 11-303438
Nov. 17, 1999 (JP) .......................................... 11-326444

(51) Int. Cl.[7] .......................... B01D 59/44; H01J 49/00
(52) U.S. Cl. ........................ 250/288; 250/287; 250/282
(58) Field of Search ................................ 250/288, 282, 250/287

(56) References Cited

U.S. PATENT DOCUMENTS

| | | | | | |
|---|---|---|---|---|---|
| 5,252,060 | A | | 10/1993 | McKinnon et al. | |
| 5,607,654 | A | | 3/1997 | Lerner | |
| 5,629,518 | A | * | 5/1997 | Grotheer et al. | 250/287 |
| 5,632,211 | A | | 5/1997 | Okuno et al. | |
| 5,977,541 | A | | 11/1999 | Miyazawa et al. | |
| 6,189,461 | B1 | | 2/2001 | Miyazawa et al. | |
| 6,291,737 | B1 | * | 9/2001 | Miyata et al. | 588/205 |

FOREIGN PATENT DOCUMENTS

| | | | | |
|---|---|---|---|---|
| EP | 0 847 795 | A1 | | 6/1998 |
| EP | 0860859 | A1 | | 8/1998 |
| EP | 0882933 | A1 | | 12/1998 |
| EP | 0921393 | A2 | | 6/1999 |
| JP | 8-222181 | A | | 8/1996 |
| JP | 9-243601 | A | | 9/1997 |
| JP | 2807201 | | | 7/1998 |
| JP | 11-14596 | | | 1/1999 |
| JP | 11-218520 | A | | 8/1999 |
| JP | 11-218521 | A | | 8/1999 |
| JP | 11-218522 | A | | 8/1999 |
| JP | 02001062251 | A | * | 3/2001 |
| JP | 02001141697 | A | * | 5/2001 |
| RU | 94026309 | A1 | | 6/1996 |

OTHER PUBLICATIONS

C. Weickhardt et al., Laser Mass Spectrometry of Dibenzodioxin, Dibenzufuran and Two Isomers of Dichlorodibenzodioxins Selective Ionization, Rapid Communications in Mass Spectrometry, 1993, pp. 183–185, vol. 7, John Wiley & Sons, Ltd.

* cited by examiner

*Primary Examiner*—Bruce Anderson
(74) *Attorney, Agent, or Firm*—Birch, Stewart, Kolasch, & Birch, LLP.

(57) ABSTRACT

A dioxins analyzer of the present invention applies laser light of a broad spectral width to a gas or solution containing dioxins to perform laser multiphoton ionization of the dioxins, and then measures the ionized dioxins. The dioxins contained in a gas such as an exhaust gas or in water such as waste water can be analyzed in real time.

19 Claims, 16 Drawing Sheets

METHOD AND APPARATUS FOR LASER ANALYSIS OF DIOXINS

BACKGROUND OF THE INVENTION

1. Field of the Invention

This invention relates to a method and an apparatus for laser analysis of dioxins, adapted to analyze dioxins, which are contained in a gas such as an exhaust gas or water such as waste water, in real time. More specifically, the invention relates to a dioxins analyzer for directly analyzing dioxins in an exhaust gas, which is discharged from an incinerator, a thermal decomposition furnace, or a melting furnace, such as a municipal solid waste incinerator, an industrial waste incinerator, or a sludge incinerator, in real time without a time delay; a combustion control system for controlling combustion in the furnace based on the results of analysis by the analyzer; and a dioxins analysis method and a dioxins analyzer for measuring the concentration of a hazardous substance such as an organohalogen compound in seepage water from a dumping site or industrial waste water, and a waste water treatment system using the analysis method or analyzer.

2. Description of the Related Art

Dioxin has high toxicity in a tiny amount, and development of a high sensitivity method for its analysis is desired. Thus, the application of a laser analysis method capable of high sensitivity analysis has been worked out. In recent years, a proposal has been made that a combination of supersonic jet spectroscopy and resonance enhanced multiphoton ionization can measure the spectra of chlorine substituted compounds which belong to dioxins (C. Weickhardt, R. Zimmermann, U. Bosel, E. W. Schlag, Papid Commun, Mass Spectron, 7, 198(1993)).

However, the above proposal concerns a method for analyzing a gas, which ejects a gas sample as a jet in a vacuum and cools it instantaneously to a temperature close to absolute zero point, thereby simplifying its spectrum. The detection limit of this method for dioxin and its derivatives (hereinafter referred to as "dioxins") is about ppb, and 5- to 6-digit concentration of the sample is necessary for the actual analysis of dioxin. As noted from this, the method takes a great deal of time and effort for detection.

The conventional manual analysis takes 1 to 2 months until the results of analysis are obtained. Thus, it is difficult to measure dioxins generated in the incinerator daily, and control combustion, as necessary, to perform an operation always fulfilling the proper regulatory value.

Furthermore, the above-mentioned method for analysis of dioxins uses laser light of a pulse width of the order of nanoseconds ($10^{-9}$ second) for selective ionization. As the number of the chlorine atoms increases, intersystem crossing into a triplet system occurs because of a so-called heavy atom effect, shortening the life of excitation. Consequently, no ion signals are observed.

A method for detecting sample molecules, which comprises irradiating sample molecules with laser light to ionize them selectively, was proposed (see Japanese Unexamined Patent Publication No. 222181/1996) . When the sample molecules are selectively ionized, only the targeted sample can be detected, and the current homologues of dioxins in the exhaust gas cannot be analyzed in real time. Moreover, nanosecond laser light with a satisfactory detection sensitivity is used in selective ionization. In this case, however, real-time analysis of dioxins is impossible, as stated earlier. According to the proposed method, only one particular isomer can be measured. When measuring other substances, wavelength scanning is necessary. In making measurements while scanning wavelengths, adjustment for varying wavelengths needs to be made for each measurement. The adjustment takes so much time that homologues of dioxins in the exhaust gas cannot be analyzed in real time. According to the proposal, moreover, selective ionization may result in the failure to show detection peaks, if the wavelength varies only by several picometers (pm). Thus, constant correction of wavelength is necessary. In detecting dioxins at a location adjacent to the incinerator in actual operation, extensive damping means is needed for preventing vibrations, and measurement of dioxins is interrupted at each wavelength correction.

It has also been proposed to estimate the concentration of dioxins by measuring the concentration of CO, and control combustion in an incinerator or the like based on the estimates. When the CO concentration is as high as 100 ppm, there confirms to be a correlation between the CO concentration and the dioxins concentration. As shown in FIG. 14, however, no correlation holds between the dioxins concentration and the CO concentration in a region in which the CO concentration is as low as 50 ppm or less. Thus, measurement of the CO concentration alone is not sufficient for effective control of combustion which can prevent the occurrence of dioxins. Recent years have seen the establishment of combustion control at low CO concentrations. Consequently, there is a demand for reliable prevention of dioxins occurrence by direct instantaneous measurement of dioxins.

Decomposition products of dioxins, such as chlorobenzene (CB) and dichlorobenzene (DCB), have been considered to be correlated to dioxins in terms of concentration. The measurement of these decomposition products or dioxins precursors is not direct measurement of dioxins, and cannot lead to strict evaluation of the state in the incinerator. Thus, real-time analysis of the exhaust gas is demanded, and the utilization of the results of analysis for combustion control is desired. In detail, it has been impossible to evaluate whether decreases in the decomposition products of dioxins mean that the occurrence of dioxins has been suppressed, or the decomposition of dioxins has been suppressed, although dioxins are occurring.

In measuring a substance whose concentration correlates to the concentration of dioxins, one particular substance is measured in selective ionization, as described previously. If dioxins cannot be detected, despite their actual occurrence, because of other factors, such as displacement of the optical axis of laser light and clogging of sampling piping, the concentration of dioxins cannot be measured properly. To dissolve this drawback, it is necessary to provide two measuring devices and conduct analysis while monitoring the data obtained. In this case, an extensive analyzer is required.

Conventionally, soil water, such as seepage water from a dumping site or industrial waste water, is placed in an adjustment tank, where its amount and pH are adjusted. Then, the adjusted soil water is rid of organic matter and nitrogen components in a bioremediation tank, and coagulated with the addition of a coagulant in a coagulation-sedimentation tank to separate heavy metals and suspended solids (SS). Then, the supernatant is subjected to accelerated oxidation to decompose difficultly decomposable organic substances contained therein, including dioxins. Then, the oxidized liquid is passed through a sand filtration tower and an activated carbon adsorption tower, and then discharged as treated water. A proposal for purification of water containing dioxins, the difficultly decomposable organic substances, is a method which comprises adding hydrogen peroxide to water containing organochlorine compounds, and applying ultraviolet radiation to decompose the compounds. A method for decomposing dioxins by introducing ozone instead of irradiation with ultraviolet radiation has also been proposed.

According to the conventional methods, analysis of dioxins has been carried out, with concentration from waste water being repeated with the use of an organic solvent. Usually, a long time of more than 70 hours has been taken, making rapid measurement difficult. To decrease the dioxins concentration in the waste water, application of ultraviolet rays or injection of much ozone, as described above, has been performed. Measurement responsive to the concentration of dioxins in waste water is still difficult, and decomposition of the dioxins in the presence of an excess of ultraviolet radiation or ozone is common practice. Thus, a demand is made for decomposition adapted for the concentration of hazardous substances in waste water, including dioxins.

SUMMARY OF THE INVENTION

The present invention has been accomplished in light of the foregoing problems with the earlier technologies. The object of the invention is to provide a method and an apparatus for laser analysis of dioxins, which can make real-time analysis of dioxins contained in a gas such as an exhaust gas or water such as waste water.

An aspect of the present invention is a dioxins analyzer for applying laser light to a gas or solution containing dioxins to perform laser multiphoton ionization of the dioxins, and then measuring the ionized dioxins.

Thus, the analysis of dioxins can be conducted in real time.

Another aspect of the invention is a dioxins analyzer, comprising:

sampling means for directly sampling a combustion gas containing dioxins in an exhaust gas discharged from an incinerator, a thermal decomposition furnace, or a melting furnace;

ejection means for ejecting the sampled gas containing the dioxins into a vacuum chamber with the use of a nozzle having a pulse valve for forming a supersonic jet;

laser applicator means for applying laser light of a broad spectral width into the ejected supersonic jet to form molecular ions of homologues of the dioxins during a resonance enhanced ionization process; and a time-of-flight mass spectrometer for analyzing the resulting molecular ions for dioxins, and wherein:

the homologues of the dioxins in the combustion gas are directly analyzed.

This aspect eliminates the burden of measuring the concentration of an alternative to dioxins, such as CO, and analyzing the dioxins based on the correlation between the concentration of the alternative and the concentration of dioxins. Homologues of dioxins in the combustion gas can be analyzed directly. Unlike selective ionization, tiresome adjustment of wavelength is unnecessary, and simple analysis permits high sensitivity analysis of dioxins.

The laser light of the broad spectral width may be laser light of a pulse width shorter than a life in an electron excited state of molecules to be measured.

According to this constitution, homologues of dioxins can be analyzed simultaneously.

The laser light may be femtosecond laser light of 2 to 500 femtoseconds.

According to this constitution, homologues of dioxins can be analyzed simultaneously.

The wavelength of the laser light may be a fixed wavelength in a range of 240 to 350 nm.

According to this constitution, homologues of dioxins can be analyzed simultaneously.

The ejection means may have the pulse valve for ejecting the sampled gas in a direction coaxial with a flying direction of the ions, and the laser light may be applied from a direction perpendicular to the jet ejected from the pulse valve.

According to this constitution, all the ions ionized from dioxins in the ejected sampled gas can be detected with an ion detector.

The nozzle of the ejection means may be a slit nozzle.

According to this constitution, the ejected gas can be shaped in a rectangular form, and a further increase in the detection sensitivity can be achieved.

The sampling means may be a sampling pipe equipped with a filter for removing ash in the exhaust gas.

According to this constitution, clogging in the sampling pipe can be prevented.

The sampling means may include backwashing means.

According to this constitution, if clogging occurs, the clogged sampling pipe can be immediately washed, and analysis is not interrupted.

A front end of the sampling means may be provided in at least one location inside the incinerator, thermal decomposition furnace or melting furnace, or inside an exhaust gas flue.

According to this constitution, the site of analysis of dioxins can be set as desired.

The time-of-flight mass spectrometer may be a reflectron type mass spectrometer.

This constitution improves the sensitivity of analysis.

Another aspect of the invention is a dioxins analysis method, comprising:

multiphoton ionizing dioxins in an exhaust gas or waste water with the use of laser light, the exhaust gas being discharged from an incinerator, a thermal decomposition furnace, or a melting furnace; and analyzing homologues of the dioxins simultaneously.

According to this aspect, homologues of dioxins can be analyzed simultaneously.

The laser light of a broad spectral width may be femtosecond laser light of 2 to 500 femtoseconds.

According to this constitution, homologues of dioxins can be analyzed simultaneously.

Another aspect of the invention is a first combustion control system in an incinerator for charging a combustible material into an incinerator, a thermal decomposition furnace, or a melting furnace, maintaining an amount of heat generated by combustion at a constant level, and suppressing occurrence of a hazardous gas containing dioxins, comprising:

the aforementioned dioxins analyzer capable of instantaneously measuring the dioxins in an exhaust gas from the incinerator, thermal decomposition furnace, or melting furnace; and combustion air control means, whereby a concentration of the dioxins is detected without a time delay, and an amount of combustion air is varied according to the concentration of the dioxins detected.

According to this aspect, combustion preventing the occurrence of dioxins can be performed.

In the combustion control system, the combustion air control means may control an amount of air and a concentration of oxygen of one or both of primary combustion air and secondary combustion air.

According to this constitution, combustion without the occurrence of dioxins according to the status of combustion can be performed.

Another aspect of the invention is a second combustion control system in an incinerator for charging a combustible material into an incinerator, a thermal decomposition furnace, or a melting furnace, maintaining an amount of heat generated by combustion at a constant level, and suppressing occurrence of a hazardous gas containing dioxins, comprising:

the above dioxins analyzer capable of instantaneously measuring the dioxins in an exhaust gas from the incinerator, thermal decomposition furnace, or melting furnace; and dust collection/removal means for removing dust in the exhaust gas, whereby a concentration of the dioxins is detected without a time delay, and an amount of spray of an adsorbent for adsorbing the dioxins is varied according to the concentration of the dioxins detected.

According to this aspect, the adsorbent can be sprayed as required, and can be controlled to an appropriate spray amount.

Another aspect of the invention is a third combustion control system in an incinerator for charging a combustible material into an incinerator, a thermal decomposition furnace, or a melting furnace, maintaining an amount of heat generated by combustion at a constant level, and suppressing occurrence of a hazardous gas containing dioxins, comprising:

the above dioxins analyzer capable of instantaneously measuring the dioxins in an exhaust gas from the incinerator, thermal decomposition furnace, or melting furnace;

combustion air control means; and dust collection/removal means for removing dust in the exhaust gas, whereby a concentration of the dioxins is detected without a time delay, an amount of combustion air is varied according to the concentration of the dioxins detected, and an amount of spray of an adsorbent for adsorbing the dioxins is varied according to the concentration of the dioxins detected.

According to this aspect, efficient combustion preventing the occurrence of dioxins can be performed, and also the adsorbent can be sprayed as required, and can be controlled to an appropriate spray amount.

Another aspect of the invention is a fourth combustion control system in an incinerator for charging a combustible material into an incinerator, a thermal decomposition furnace, or a melting furnace, maintaining an amount of heat generated by combustion at a constant level, and suppressing occurrence of a hazardous gas containing dioxins, comprising:

the above dioxins analyzer capable of instantaneously measuring the dioxins in an exhaust gas from the incinerator, thermal decomposition furnace, or melting furnace; and a stabilizing burner, whereby a concentration of the dioxins is detected without a time delay, and a supporting gas is fed into the exhaust gas according to the concentration of the dioxins detected to burn the dioxins in the exhaust gas.

According to this aspect, discharge of dioxins to the atmosphere can be suppressed.

Another aspect of the invention is a fifth combustion control system in an incinerator for charging a combustible material into an incinerator, a thermal decomposition furnace, or a melting furnace, maintaining an amount of heat generated by combustion at a constant level, and suppressing occurrence of a hazardous gas containing dioxins, comprising:

the above dioxins analyzer capable of instantaneously measuring the dioxins in an exhaust gas from the incinerator, thermal decomposition furnace, or melting furnace;

combustion air control means; and a stabilizing burner, whereby a concentration of the dioxins is detected without a time delay, an amount of combustion air is varied according to the concentration of the dioxins detected, and a supporting gas is fed into the exhaust gas according to the concentration of the dioxins detected to burn the dioxins in the exhaust gas.

According to this aspect, efficient combustion preventing the occurrence of dioxins can be performed, and discharge of dioxins to the atmosphere can be suppressed even if resynthesis of dioxins in the flue takes place.

The dioxins analysis method may comprise:

applying laser light to a surface of a solution to be measured to perform laser multiphoton ionization of dioxins on the surface; and determining a concentration of the dioxins in the solution to be measured.

In the dioxins analysis method, the laser light may be nanosecond laser light or femtosecond laser light.

In the dioxins analysis method, the laser light may be laser light of a wavelength of 300 nm or less.

The aforementioned dioxins analyzer may comprise:

a laser device for applying laser light to a surface of a solution, which is to be measured, in a reservoir;

a counter electrode provided opposite the surface of the solution, which is to be measured, in the reservoir;

a high voltage power source for applying a high voltage between the counter electrode and the reservoir; and a processor for amplifying and processing an electric current signal obtained.

In the dioxins analyzer, an incidence angle of the laser light applied to the surface of the solution to be measured may be 15 degrees or less.

In the dioxins analyzer, the laser light may be nanosecond laser light or femtosecond laser light.

In the dioxins analyzer, the wavelength of the laser light may be a fixed wavelength in a range of 240 to 300 nm.

Another aspect of the invention is a waste water treatment system for decomposing difficultly decomposable substances in waste water, including:

the dioxins analyzer of the invention capable of measuring a concentration of dioxins in the waste water, and wherein:

the concentration of the dioxins is detected without a time delay, and the dioxins in the waste water are decomposed in the presence of hydroxyl radicals according to the detected concentration of the dioxins.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Preferred embodiments of the present invention will now be described in detail with reference to the accompanying drawings, but they are in no way limit the invention.

Figure 1:
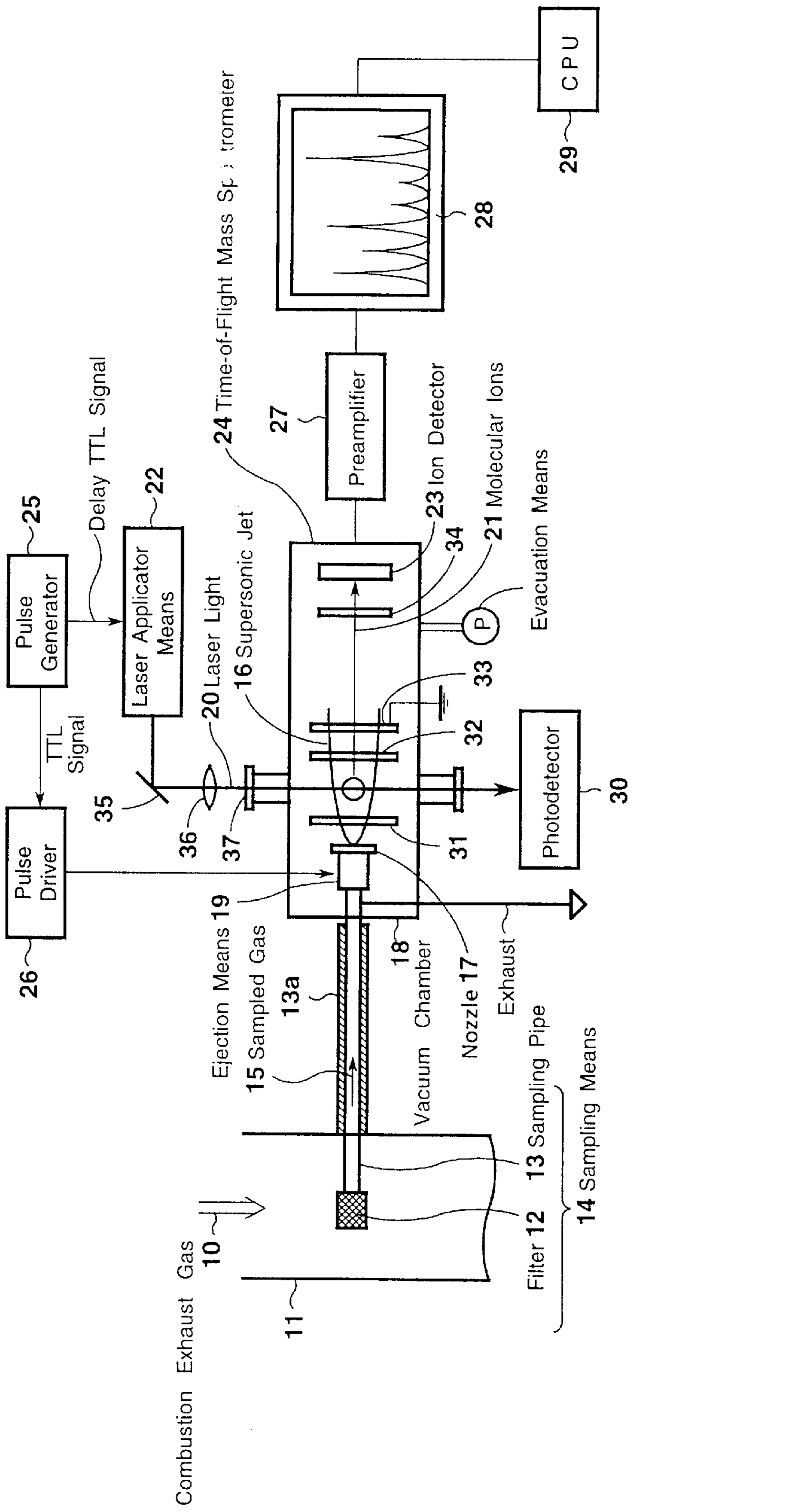
FIG. 1 is a schematic view of a dioxins analyzer according to an embodiment of the present invention.

FIG. 1 is a schematic view of a dioxins analyzer according to an embodiment of the present invention. As shown in FIG. 1, the dioxins analyzer of the present embodiment is composed of sampling means 14 comprising a sampling pipe 13 for directly sampling a combustion gas 10 containing dioxins, which has been discharged from an incinerator, a thermal decomposition furnace, or a melting furnace (may be hereinafter referred to simply as "furnace"), from a flue 11 in the furnace, the sampling pipe 13 having a filter 12 at its front end; ejection means 19 for ejecting the sampled gas 15 containing the dioxins into a vacuum chamber 18 with the use of a nozzle 17 having a pulse valve for forming a supersonic jet 16; laser applicator means 22 for applying laser light 20 of a broad spectral width into the ejected supersonic jet 16 to form molecular ions 21 of homologues of the dioxins during a resonance enhanced ionization process; and a time-of-flight mass spectrometer 24 for analyzing the resulting molecular ions 21 for dioxins, the mass spectrometer 24 having an ion detector 23. Configured in this manner, the dioxins analyzer can directly analyze the homologues of the dioxins in the combustion gas 11.

In FIG. 1, the reference numeral 25 denotes a pulse generator, 26 a pulse driver, 28 a digital oscilloscope, 29 an information processor, 30 a photodetector, 31 to 34 electrodes, 35 a mirror, 36 a condenser lens, and 37 a laser introduction window.

In the above analyzer, laser light from the laser applicator means 22 is reflected by the reflecting mirror 35. The reflected laser light is condensed by the condenser lens 36, and introduced into the vacuum chamber 18 through the laser introduction window 37. Separately, the sampled gas 15 from inside the furnace is fed to the pulse nozzle 17 of the ejection means 19. The pulse generator 25 produces TTL signals, which control the pulse driver 26 to open the pulse nozzle. 17 for a certain period of time. (200 to 500 μs), thereby forming the supersonic jet 16. The pulse generator 25 also produces delay signals to control the laser light 20 of a broad spectral width such that the laser light is applied to the supersonic jet when the molecules in the jet to be analyzed reach the spacing between the electrodes 31 and 32.

Laser light is in pulsed form. Thus, the introduction of the sample while no laser is oscillated increases the burden on the vacuum system, and wastefully increases the amount of the sample necessary for analysis.

Hence, the sample can be introduced in pulsed form in synchronism with the period of laser oscillation.

The resulting molecular ions 21 are subjected to an electric field applied by an electron lens formed by the electrodes 31, 32, 33, 34, and are then detected by the ion detector 23. The present system constitutes a time-of-flight mass spectrometer. Thus, even if molecules with a low ionization potential are incorporated and ions are produced during non-resonance ionization, such ions can be distinguished from the desired molecules based on the difference in the mass number. Electric signals proportional to the number of ions can be obtained at the ion detector 23. These electric signals are amplified by a preamplifier 27, and the mass spectrum can be monitored by the digital oscilloscope 28. To process the mass spectrum data, the signals are sent to the information processor 29 for signal processing.

As described above, the invention jointly uses resonance enhanced multiphoton ionization (REMPI) and time-of-flight mass spectrometry (TOFMAS), and also uses laser light of a broad spectral width (femtosecond laser light). Thus, the invention can measure homologues of dioxins simultaneously.

According to the invention, the mass spectrum is measured with the time-of-flight mass spectrometer 24. If the laser intensity varies during long-term measurement, for example, the pattern changes. Thus, the photodetector 30 is provided for detecting the intensity of laser light. The laser intensity is monitored with the photodetector 30. Where necessary, the laser intensity may be standardized, and a correction of the intensity may be made to improve the accuracy of the mass spectrum data.

The invention uses laser light of a long wavelength as the laser light 20, and thus can ionize homologues of the dioxins in the combustion gas simultaneously. Even if molecules with a low ionization potential are incorporated and ions are produced during non-resonance ionization, precise analysis can be made based on the difference in the time of flight, because the time-of-flight mass spectrometer is used to detect the ions.

The filter 12 provided at the front end of the sampling pipe 13 of the sampling means 14 is preferably a metallic filter which can withstand high temperatures. To prevent clogging of the sampling pipe 13, it is preferred to use the filter with a dust removal rate of 99% or more. To prevent clogging of the filter 12 of the sampling pipe 13 in the sampling means 14, backwash means may be provided for performing back-washing with a nitrogen gas purge, for example.

According to the invention, laser light of a broad spectral width is employed. As a result, a plurality of organic molecules other than dioxins are simultaneously ionized. Thus, the organic molecules (e.g., benzene) other than dioxins may be taken as an indicator. By monitoring changes in the signal intensity of the organic molecules, clogging can be watched for. Alternatively, regardless of changes in the signal intensity, the filter may be purged with a nitrogen gas at certain time intervals for its backwashing.

The front end of the sampling pipe 13 is exposed to high temperatures of a combustion exhaust gas in the furnace or the flue. Thus, resynthesis of dioxins is unlikely at this site. Accordingly, a distribution of homologues of dioxins in the furnace or flue can be directly sampled.

In the present embodiment, the filter 12 is provided in the flue. However, the filter 12 may be interposed midway in the sampling pipe 13.

The outer periphery of the sampling pipe 13 is covered with protective means 13*a* so that the piping temperature will be kept at 120 to 200° C. If the piping temperature is lower than 120° C., condensation may occur because of much water contained in the combustion gas 10. At a high temperature above 200° C., resynthesis of dioxins will start. The temperature range of 120 to 200° C. is intended to prevent these events.

The suction rate of the exhaust gas is preferably about 0.5 to 1.0 liter/min. This is to prevent dust in the exhaust gas, which is of the order of submicrons, from adhering to the piping. Further preferably, piping interiorly coated with a coating material such as silica (e.g., silicosteel) is used as the sampling pipe 13. This is to prevent dioxins from adhering to the interior of the sampling pipe 13.

To obtain the laser light of a long wavelength, it is preferred to use a femtosecond pulsed laser (1 fs=$10^{-15}$ s) as an excitation laser. An example of the laser light of a broad spectral width is laser light of a pulse width shorter than the life in an electron excited state of the molecules to be measured. Particularly preferred laser light is femtosecond laser light of 2 to 500 femtoseconds (more preferably, 150 to 300 femtoseconds). As laser light of the above femtoseconds, a third harmonic of a semiconductor laser, an excimer laser, or a titanium sapphire laser is usable.

Figure 5A:
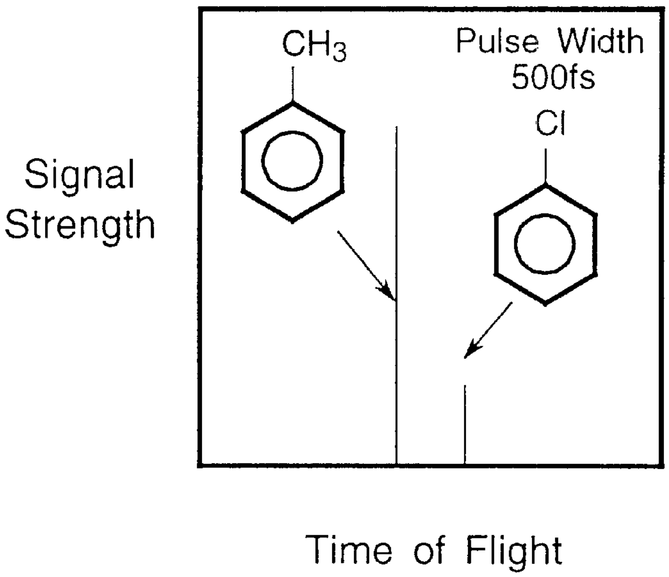
FIGS. 5(A) and 5(B) are views showing the results of analysis of a toluene-monochlorobenzene mixture with the use of pulsed laser light (A) of a pulse width of 500 fs and pulsed laser light (B) of a pulse width of 15 ns, respectively.
Figure 5B:
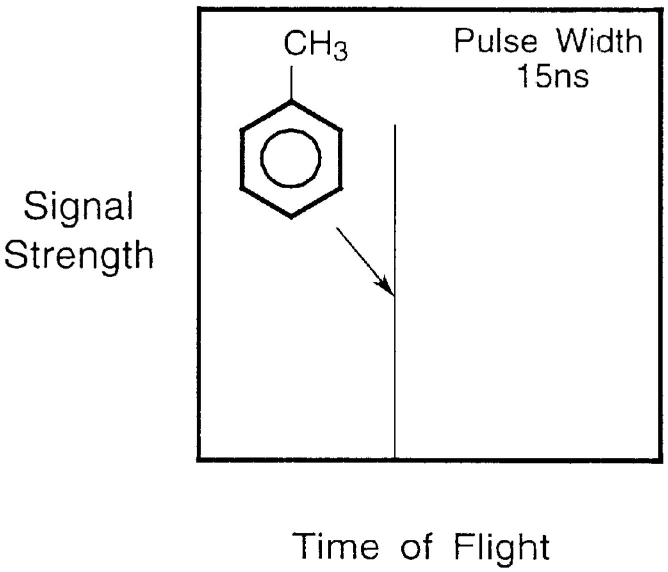

The wavelength for measurement is not restricted, as long as it is a wavelength which excites and ionizes dioxins and precursors of dioxins. A fixed wavelength in a range of 240 to 350 nm is available. This is because the spectral width of the femtosecond laser light is so broad that a strict wavelength according to the type of the object to be analyzed need not be selected. As shown in FIG. 5(A), when pulsed laser light of an arbitrary fixed wavelength (248 nm) and a pulse width of 500 fs was applied to a mixture of toluene and monochlorobenzene, peaks for both substances were observed, meaning that ionization and analysis were possible. On the other hand, when pulsed laser light of a pulse width of 15 ns was applied to a toluene-monochlorobenzene mixture, monochlorobenzene could not be ionized, and only a peak for toluene was observed, as shown in FIG. 5(B). This is because monochlorobenzene is excited upon exposure to laser light of the nanosecond order, but is ionized with poor efficiency because of the presence of a chlorine atom.

Figure 6A:
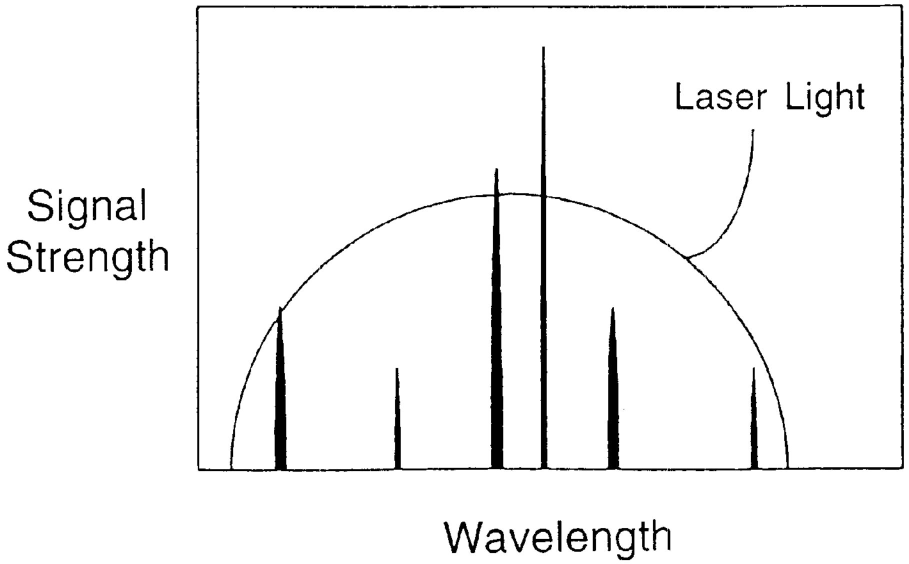
FIGS. 6(A) and 6(B) are views showing the spectral widths of pulsed laser light (A) of a pulse width of 500 fs and pulsed laser light (B) of a pulse width of 15 ns, respectively.
Figure 6B:
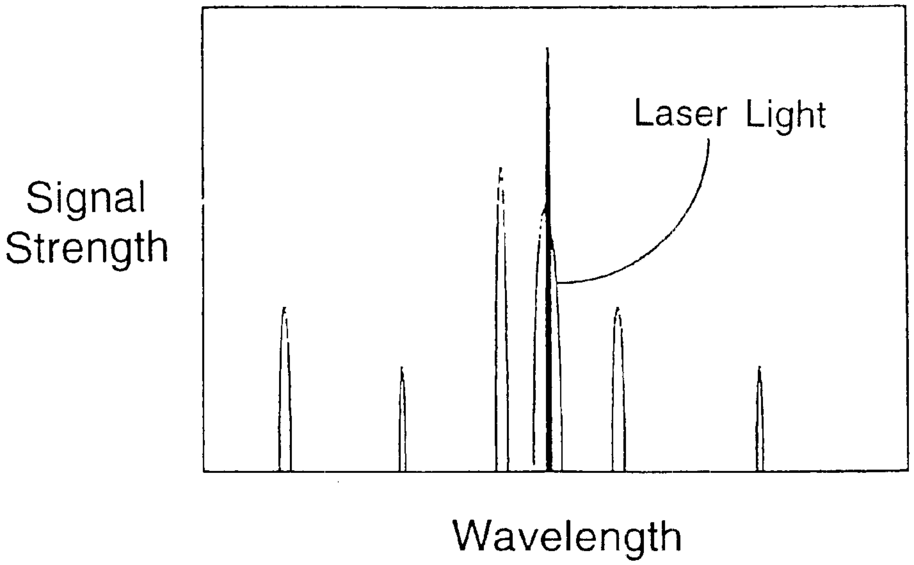
Figure 7A:
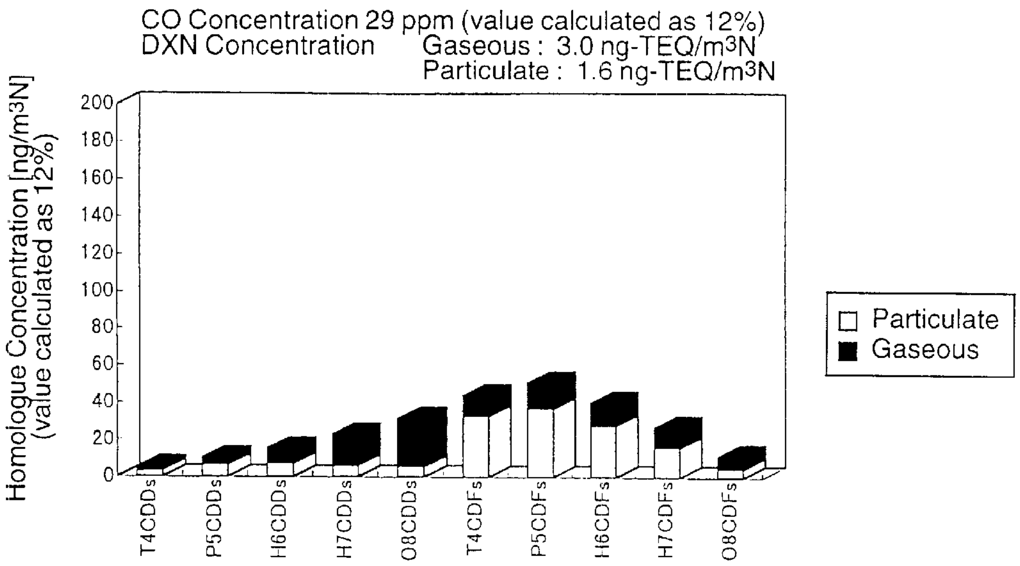
FIGS. 7(A) and 7(B) are views showing the distribution of dioxin homologues in low concentrations.
Figure 7B:
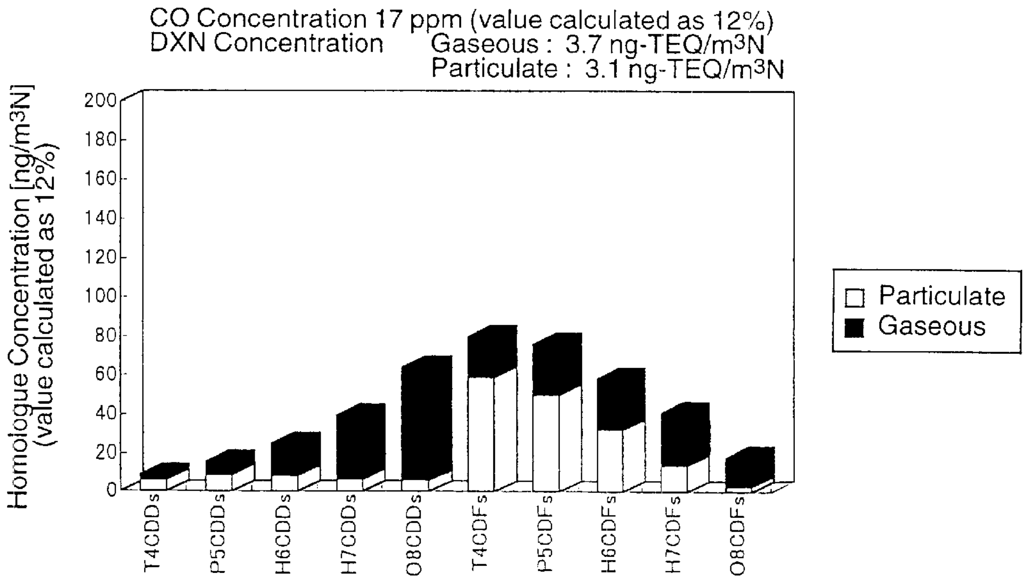
Figure 8A:
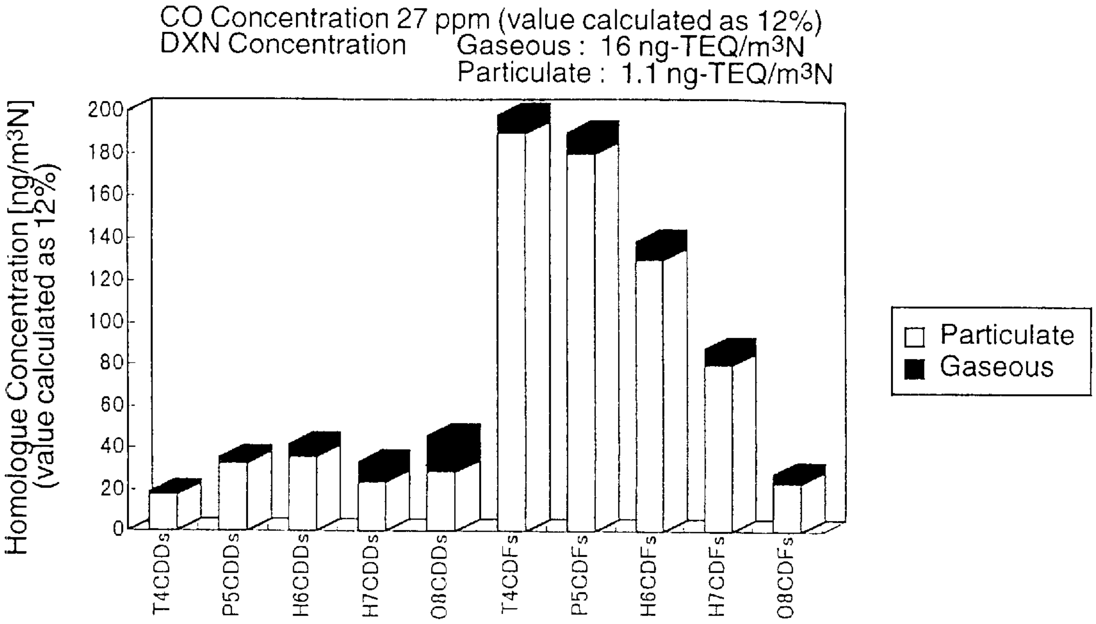
FIGS. 8(A) and 8(B) are views showing the distribution of dioxin homologues in high concentrations.
Figure 8B:
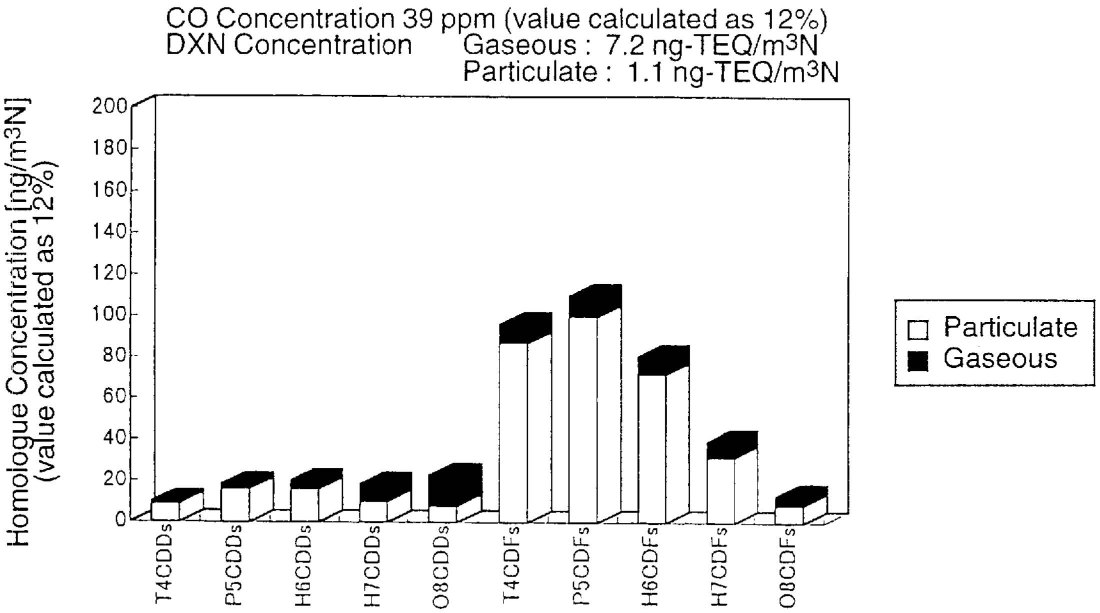

According to Heisenberg's uncertainty principle, when the pulse width of laser light is short, the wavelength resolving power worsens. In the case of a pulse width of 300 femtoseconds, for example, the resolving power widens to about 8 nm, as shown in FIG. 6(A). Thus, a plurality of dioxins can be simultaneously excited and ionized (solid peaks) . With the conventional nanosecond pulsed laser, by contrast, ionization is performed only selectively at a high resolving power of 0.6 pm, as shown in FIG. 6(B). Furthermore, because of the heavy atom effect of the chlorine atoms of dioxins, the ionization efficiency lowers. Consequently, the sensitivity is insufficient, making detection impossible. Accordingly, the use of ultrashort pulsed laser light (femtosecond laser light) of a pulse width shorter than the life of the electron excited state molecules as in the invention makes it possible to detect homologues of dioxins.

In analyzing homologues of dioxins, samples having different molecular weights can be immediately differentially identified based on the mass spectra. Even for the substances of the same molecular weight, isomers can be distinguished by detecting, beforehand, the wavelength dependency of the ion signal for the targeted mass number.

The detection sensitivity for the detection of particular isomers and precursors of dioxins corresponding to 0.1 ng-TEQ/$Nm^3$ (TEQ: toxicity equivalency quantity) as the regulatory value of dioxins in the exhaust gas (the value corresponds to the actual concentration of dioxins of 5 ng/Nm) is required to be 0.5 ng/Nm (0.03 pptv) for the total concentration of dibenzofuran pentachloride as an example of a particular isomer of dioxin, 2000 ng/Nm (4 pptv) for the total concentration of chlorobenzene as an example of a precursor of dioxin, and 200 ng/Nm (20 ppt) for monochlorobenzene. According to the invention, selective ionization is not performed, but all the homologues and precursors of dioxins are ionized, so that their total amount can be measured.

As shown in FIGS. 7(A) and 7(B) and 8(A) and 8(B), the measured distribution of dioxins in the exhaust gas from the furnace is such that among gaseous homologues of dioxins, furan homologues such as dibenzo-p-furan tetrachloride ($T_4CDF$) to dibenzo-p-furan heptachloride ($H_7CDF$) are higher in concentration than dioxin homologues such as dibenzo-p-dioxin tetrachloride ($T_4CDD$) to dibenzo-p-dioxin pentachloride ($P_5CDD$) which have been considered to have potent toxicity. By measuring these furan homologues, the relative amounts of dioxins can be determined.

Figure 9:
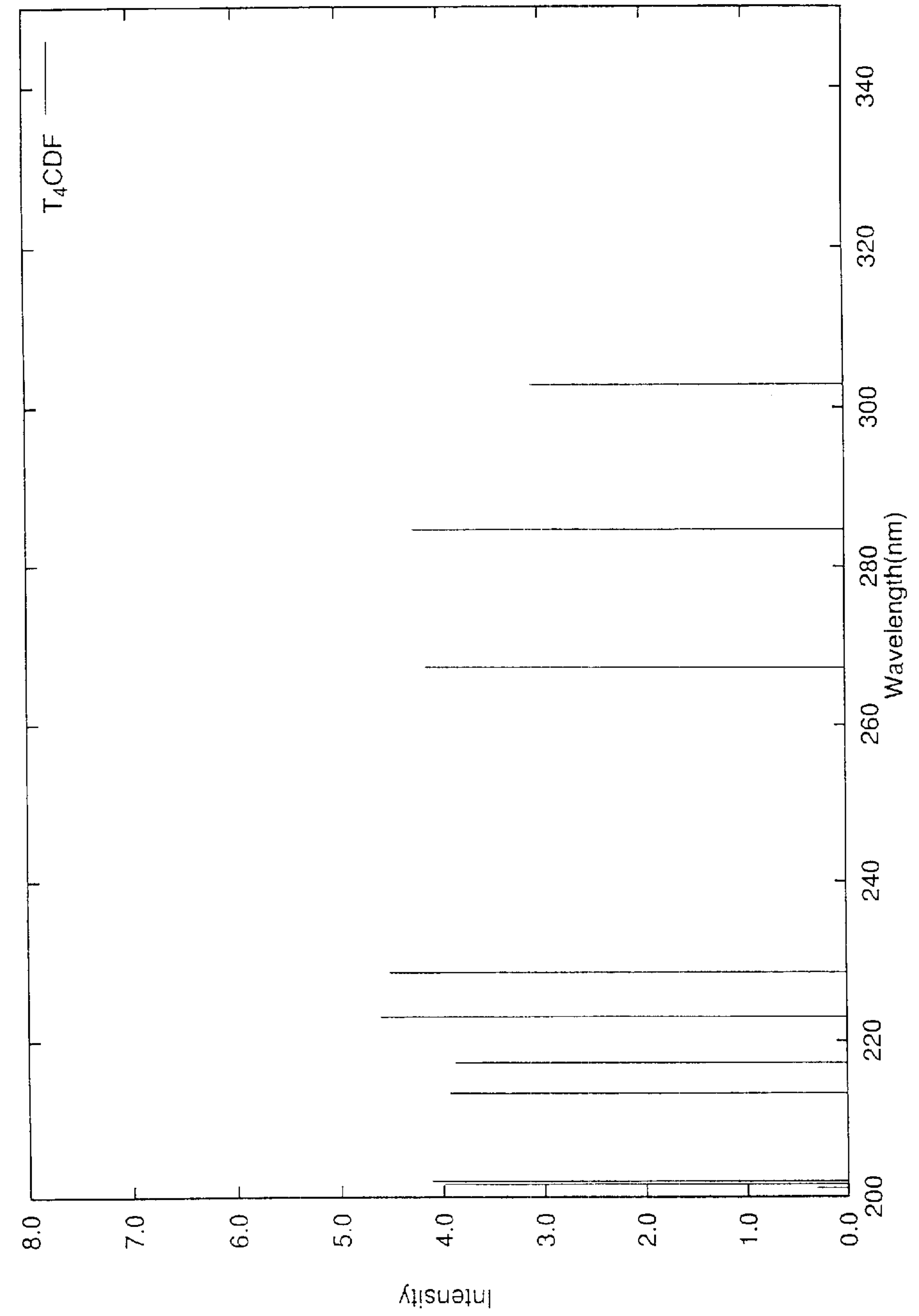
FIG. 9 is a view showing the results of measurement of the spectrum of dibenzo-p-furan tetrachloride ($T_4CDF$)
Figure 10:
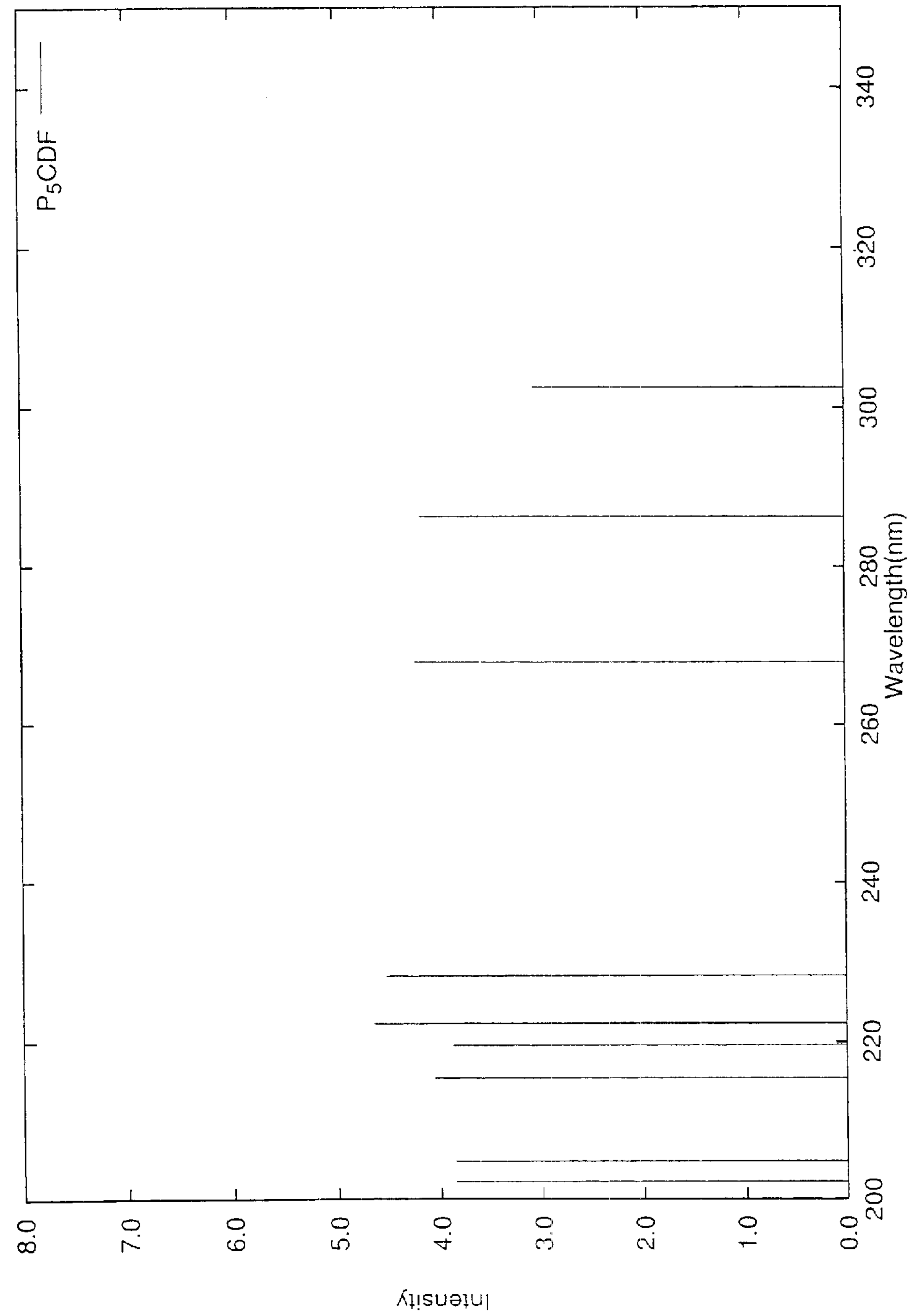
FIG. 10 is a view showing the results of measurement of the spectrum of dibenzo-p-furan pentachloride ($P_5CDF$)

FIGS. 9 and 10 show the results of theoretical calculation of the spectra of dibenzo-p-furan tetrachloride ($T_4CDF$) and dibenzo-p-furan pentachloride ($P_5CDF$) . The detection peaks lie near 260 nm, and the peaks for dibenzo-p-furan pentachloride shift toward 270 nm in comparison with the peaks for dibenzo-p-furan tetrachloride. Dibenzo-p-furan octachloride ($O_8CDF$) also has peaks near 275 nm. It has thus been demonstrated that these compounds can be ionized upon exposure to laser light at a wavelength of, for example, 260 nm, and can be measured.

In the invention, the position at which the laser light 20 is applied to the sampled gas 15 to ionize it is preferably in the range x/D=10 to 70 (preferably 15<x/D <50), more preferably x/D=about 31, that is the relationship defined by the nozzle diameter (D) and the distance (x) between the nozzle position and the position of application of laser light, the relationship used in the conventional molecular beam spectroscopy. Concretely, when the nozzle diameter is 0.8 mm, laser light is applied at a position about 25 mm apart from the nozzle hole.

When femtosecond laser light is used, molecular collision still occurs immediately after ejection from the nozzle, and cooling is insufficient. After the sample comes into a translational state, it can be sufficiently excited and ionized. The reason is as follows: In selective ionization, full cooling to close to the absolute zero point is necessary to improve sensitivity and selectivity. In the invention, on the other hand, selective ionization is unnecessary, so that full cooling is not required.

To improve the measurement of homologues of dioxins with the use of femtosecond laser light in the invention, it is advisable for the ejection means 19 to include the nozzle 17 having the pulse valve for ejecting the sampled gas 15 coaxially with the flying direction of the molecular ions 21. It is also advisable for the laser light 20 to be applied from the direction perpendicular to the direction of the supersonic jet 16 ejected from the pulse valve of the nozzle 17.

Figure 2A:
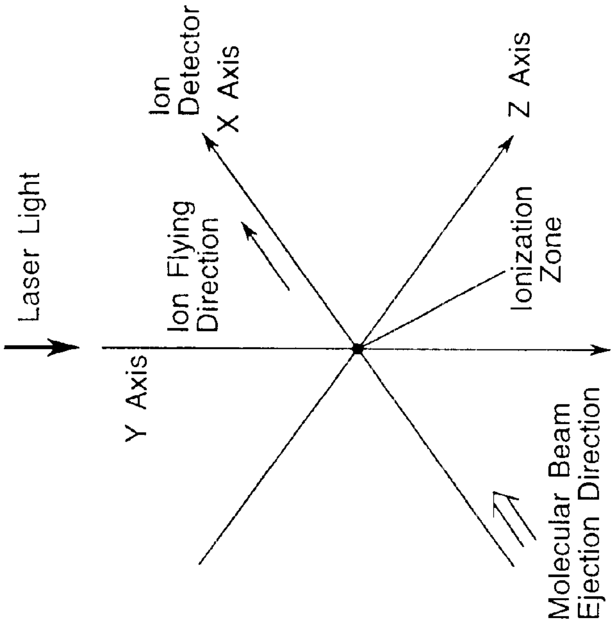
FIGS. 2(A) and 2(B) are concept views showing flying directions of ions.
Figure 2B:
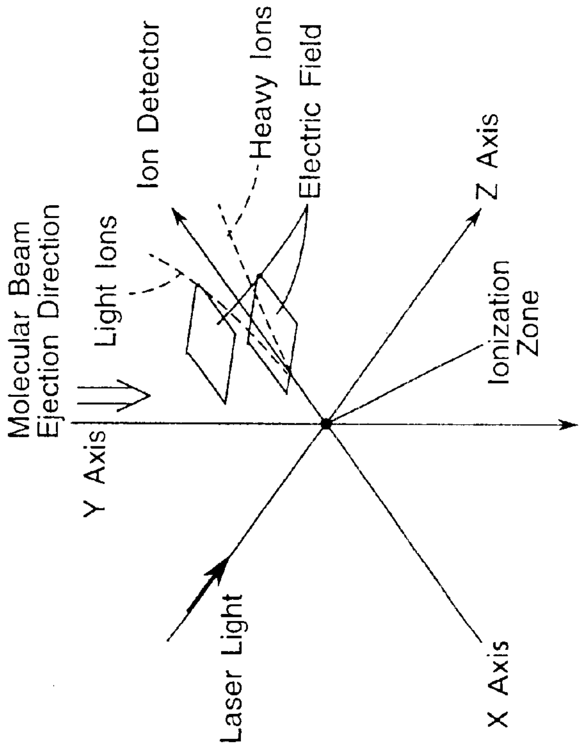

In the invention, the direction of ejection of a molecular beam forming the supersonic jet 16 is coaxial with the flying direction of the ions (the coaxial direction will be designated hereinafter as the [X-axis direction]). As shown in FIG. 2(A), therefore, all ions (light ions to heavy ions) ionized from dioxins in the ejected sampled gas arrive at the ion detector 23. In selective ionization using nanosecond laser light, on the other hand, the direction of ejection of a molecular beam forming the supersonic jet 16, i.e., [Y-axis direction], is perpendicular to the ion flying direction [X-axis direction], as shown in FIG. 2(B).

In this case, an electric field is applied depending on the weight of ions, whereby desired ions are introduced into the ion detector. Thus, it is difficult to guide all the ions to the ion detector.

Accordingly, it is vital that the direction of the molecular beam and the flying direction of ions be the same, in order to measure homologues of dioxins and dioxins precursors of their decomposition products. For example, when light ions are benzene, heavy ions are dioxins, and ions of an intermediate weight are precursors of dioxins, all the ionized substances reach the detector in the case of FIG. 2(A). In FIG. 2(B), ions of only one particular type can reach the detector, thus lowering the accuracy of coincidence measurement of the homologue distribution. In the case of FIG. 2(B), moreover, laser light is applied from one side surface of the electrode because of the relationship between the electric field and the electrode, thereby disturbing the electric field. Thus, the distance between the nozzle and the electrode cannot be rendered small. The configuration of FIG. 2(A) does not disturb the electric field, and can bring the nozzle 17 and the electrode 31 close to each other. Hence, laser light can be applied in a high sample density state, so that the detection sensitivity can be increased.

Figure 3:
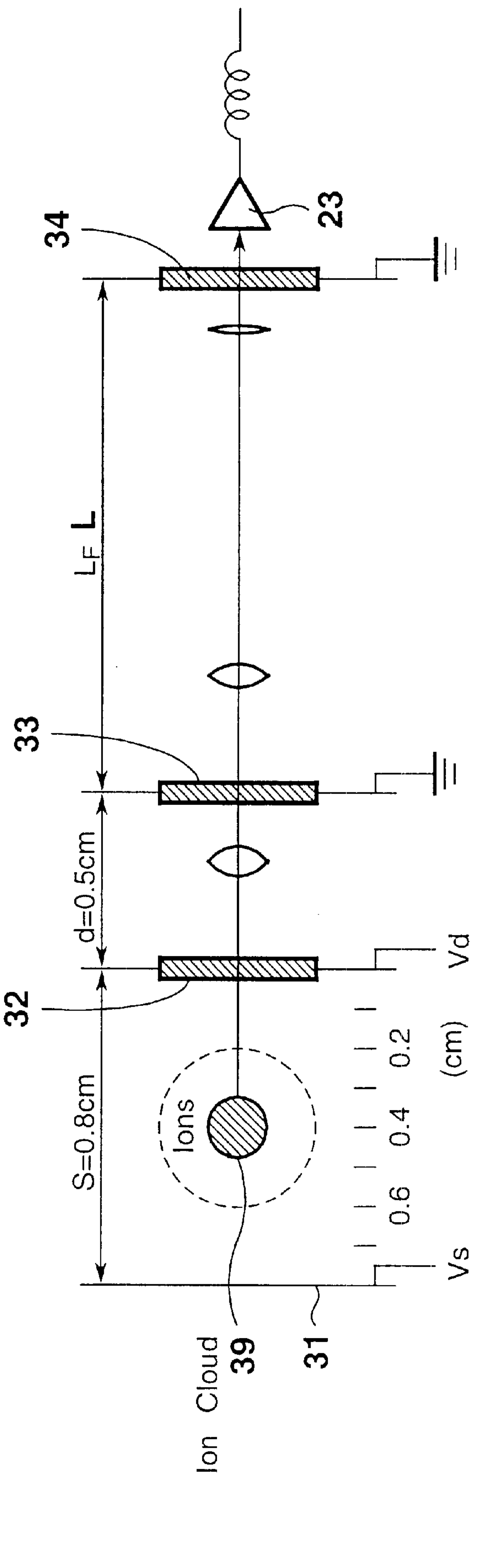
FIG. 3 is a schematic view showing an ion cloud of dioxins flying to a detector.

FIG. 3 is a schematic view showing a state in which an ion cloud of dioxins is flying to a detector. In FIG. 3, electrodes 31 to 34 are arranged, and a voltage of $V_s$ is applied to the electrode 31, while a voltage of $V_d$ is applied to the electrode 32. An ion cloud 39 is formed between the electrodes 31 and 32, and the distance between the electrodes 31 and 32 is, for example, 0.8 cm, while the distance between the electrodes 32 and 33 is, for example, 0.5 cm. The resulting ion cloud 39 flies in a flying tube (not shown) with a length of L, and is then detected by an ion detector 23. A region ionized by laser light has a finite breadth, and the manner of acceleration of the resulting ions differs according to the position of ion formation. Given the same mass number, the ions reach the ion detector 23 in different times, thus leading to a decrease in the resolving power. To overcome this drawback, ions are accelerated by two-stage acceleration using the electrodes 31 and 32. When the ions reach the ion detector 23, the shape of the ions is flat. Thus, the ions formed simultaneously are detected simultaneously, without a time delay, whereby the sensitivity of detection is increased.

Next will follow an explanation for means which improves the manner of ejection of the sample from the slit nozzle of the invention into a vacuum chamber, and which detects dioxins directly and rapidly with high sensitivity, without performing a step such as concentration.

Figure 4:
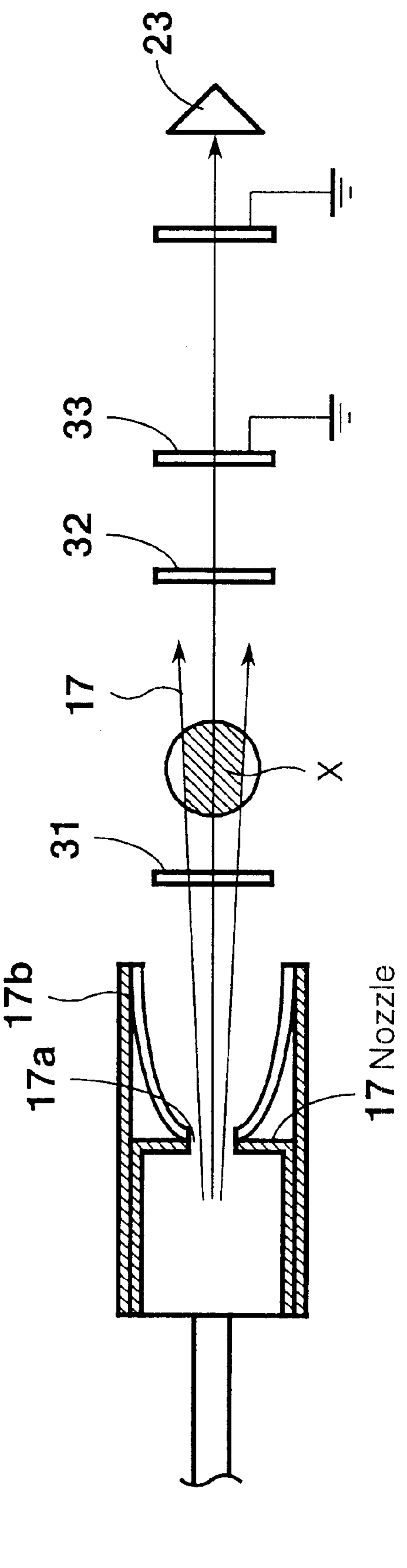
FIG. 4 is a schematic view of ejection means equipped with a slit nozzle.

As a method of increasing the sensitivity of detection, it has been known to raise the degree of convergence of laser light by a condenser lens. However, such a method cannot fully increase the detection sensitivity. Hence, the invention aims at further improving the detection sensitivity by forming an ejection from the slit nozzle into a rectangular form. As shown in FIG. 4, the slit nozzle 17 has an ejection hole 17*a* of a rectangular shape, and dioxins accompanied by a helium gas form a jet 16 in a vacuum chamber (not shown). Since the shape of the ejection hole 17*a* of the slit nozzle 17 is thus rectangular, the ejected jet 16 takes a rectangular shape in a direction of advance of laser light 20 applied. In this region, the jet 16 is effectively ionized. In FIG. 3, the laser light 20 is applied in a direction perpendicular to the sheet face. In FIG. 4, a shaded area x represents an ionized effective volume of a region in which detectable ions are actually existent. The above configuration enables the pinhole-shaped nozzle to afford sufficient sensitivity.

According to the present embodiment, a sample with a dioxin content (C)=$10^{14}$=0.01 ppt can be detected without being concentrated. Since there is a large overlap of the molecular beam 16 generated by the supersonic jet and the region where the laser light 20 can be applied, the detection sensitivity is further increased.

Furthermore, as shown in FIG. 4, an air blast restrictor 17*b* is provided on the gas ejection side of the slit nozzle 17 having the rectangular ejection hole 17*a* of the invention. Because of this measure, a further spread in the minor axis direction of the rectangular shape of the molecular beam 16 can be suppressed. Consequently, the number of the molecules, which are not irradiated with laser light, decreases radically compared with the absence of the air blast restrictor 17*b*. Thus, a further increase in the sensitivity can be achieved.

Besides, the mesh electrodes 31, 32, 33 and an ion detecting MCP (microchannel plate) as the ion detector 23 shown in FIG. 3 are in a rectangular shape. Thus, the ions can be trapped without waste, and the improvement of sensitivity can be achieved.

Next, concrete other embodiments of the measuring device of the invention will be described.

Figure 11:
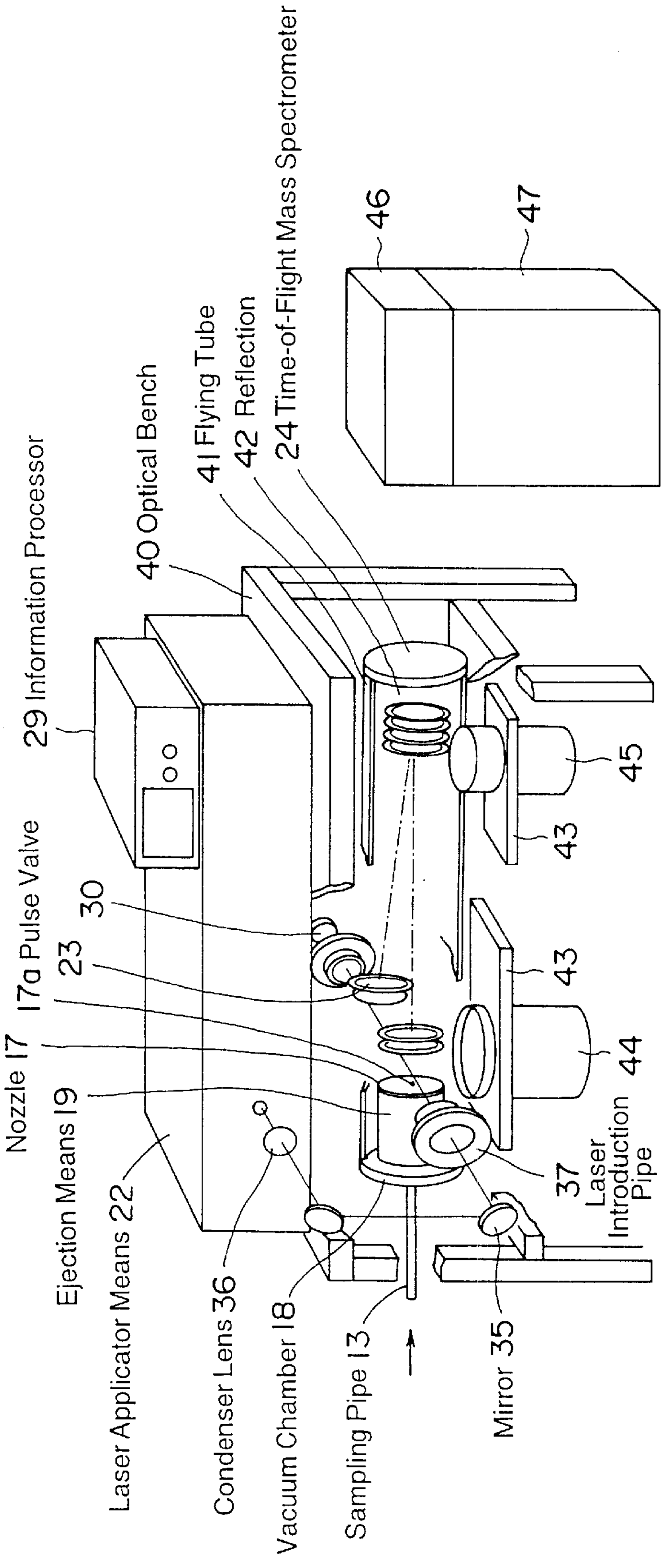
FIG. 11 is a schematic view of a dioxins analyzer having a laser light emitter and a vacuum chamber integrated thereto for forming a molecular beam flow.

FIG. 11 is a schematic view of a dioxins analyzer having a laser light emitter and a vacuum chamber integrated thereto for forming a molecular beam flow.

As shown in FIG. 11, a dioxins analyzer according to the present embodiment is composed integrally of a sampling pipe 13 for directly sampling a combustion gas 11 containing dioxins, which has been discharged from an incinerator, a thermal decomposition furnace, or a melting furnace, from inside the furnace, the sampling pipe 13 having a filter (not shown) at its front end; ejection means 19 for ejecting the sampled gas 15 containing the dioxins into a vacuum chamber 18 with the use of a nozzle 17 having a pulse valve

17*a* for forming a supersonic jet 16; laser applicator means 22 borne on an optical bench 40 for applying laser light 20 of a broad spectral width into the ejected supersonic jet 16 to form molecular ions 21 of homologues of the dioxins during a resonance enhanced ionization process; a reflectron type time-of-flight mass spectrometer 24 for analyzing the dioxins in a flying tube 41, in which the resulting molecular ions 21 fly, the spectrometer 24 having an ion detector 23 and a reflectron 42; and an information processor 29 for processing information detected by the ion detector. Concretely, the analyzer of a compact size measuring 2 m in height, 1.5 m in width, and 2 m in length, for example, can be provided. Such an analyzer is installed near the furnace to analyze homologues of dioxins in the combustion gas 11 instantaneously and directly. In FIG. 1, the numeral 43 denotes a gate valve, 44 and 45 evacuation means for reducing the pressure inside the vacuum chamber 18 and the flying tube 41, 46 a vacuum evacuation system power source control panel, and 47 a laser system power source. The laser applicator means 22 on the optical bench 40, and the mass spectrometer 24 are disposed on the same frame. Compared with a case in which they are disposed on different frames, therefore, wavelength correction responsive to vibrations inherent in respective frames is unnecessary, and the improvement of sensitivity can be achieved.

According to the invention, the mass spectrometer 24 used is of the reflectron type designed to increase the detection sensitivity. This spectrometer is based on the following principle: Of the ions having the same mass, ions with greater (smaller) translation energies enter an electric field more deeply (more shallowly) before being reflected, thereby flying over an effectively longer (shorter) distance. Thus, ions with different energies can be gathered in the detector at the same time. To prevent deterioration of the ion detector (MCP) 23 by the organic gas in the sample, the evacuation means with a sufficient capacity can be used.

In the above configuration, the interior of the vacuum chamber 18 is $10^{-5}$ torr ($1.33\times10^{-3}$ Pa), and the interior of the flying tube 41 is $10^{-7}$ torr ($1.33\times10^{-5}$ Pa).

As noted above, the use of the dioxins analyzer of the invention makes it possible to simultaneously ionize and measure the homologues of dioxins without scanning laser wavelengths. With the conventional measurement of only a single substance by selective ionization, it is difficult to distinguish between an actual decrease in the concentration of the target substance in the furnace and an apparent decrease in the concentration of the target molecules introduced into the measuring device because of an abnormality during sampling. This problem is solved by the invention that directly analyzes dioxins.

According to the conventional measuring method, only one particular isomer can be measured. When measuring other substances, wavelength scanning is necessary. In making measurements while scanning wavelengths, adjustment for varying wavelengths needs to be made for each measurement. The adjustment takes so much time that homologues of dioxins in the exhaust gas cannot be analyzed in real time. According to the invention, homologues of dioxins can be analyzed, wavelength scanning and wavelength correction are unnecessary, and a running cost during continuous long-term measurement can be reduced markedly.

It has been impossible to evaluate whether decreases in the decomposition products of dioxins mean that the occurrence of dioxins has been suppressed, or that the decomposition of dioxins has been suppressed, although dioxins are occurring. The invention can directly measure dioxins, and thus can provide accurate information for combustion control.

In measuring substances whose concentrations correlate with the concentration of dioxins, according to conventional selective ionization, one particular type of substance is measured. If this particular substance cannot be detected, despite the actual occurrence of dioxins, because of other factor, such as displacement of the optical axis of laser light or clogging of the sampling piping, the concentration of dioxins cannot be measured reliably. According to the invention, by contrast, organic molecules other than dioxins can be measured simultaneously. By monitoring behaviors of these organic molecules, troubles such as clogging can be recognized instantaneously. It becomes unnecessary to make analysis while providing a measuring device and a reference device as in earlier technologies, thus simplifying the measuring equipment.

Next, an embodiment of a furnace control method using the measuring apparatus of the invention will be described.

Figure 12:
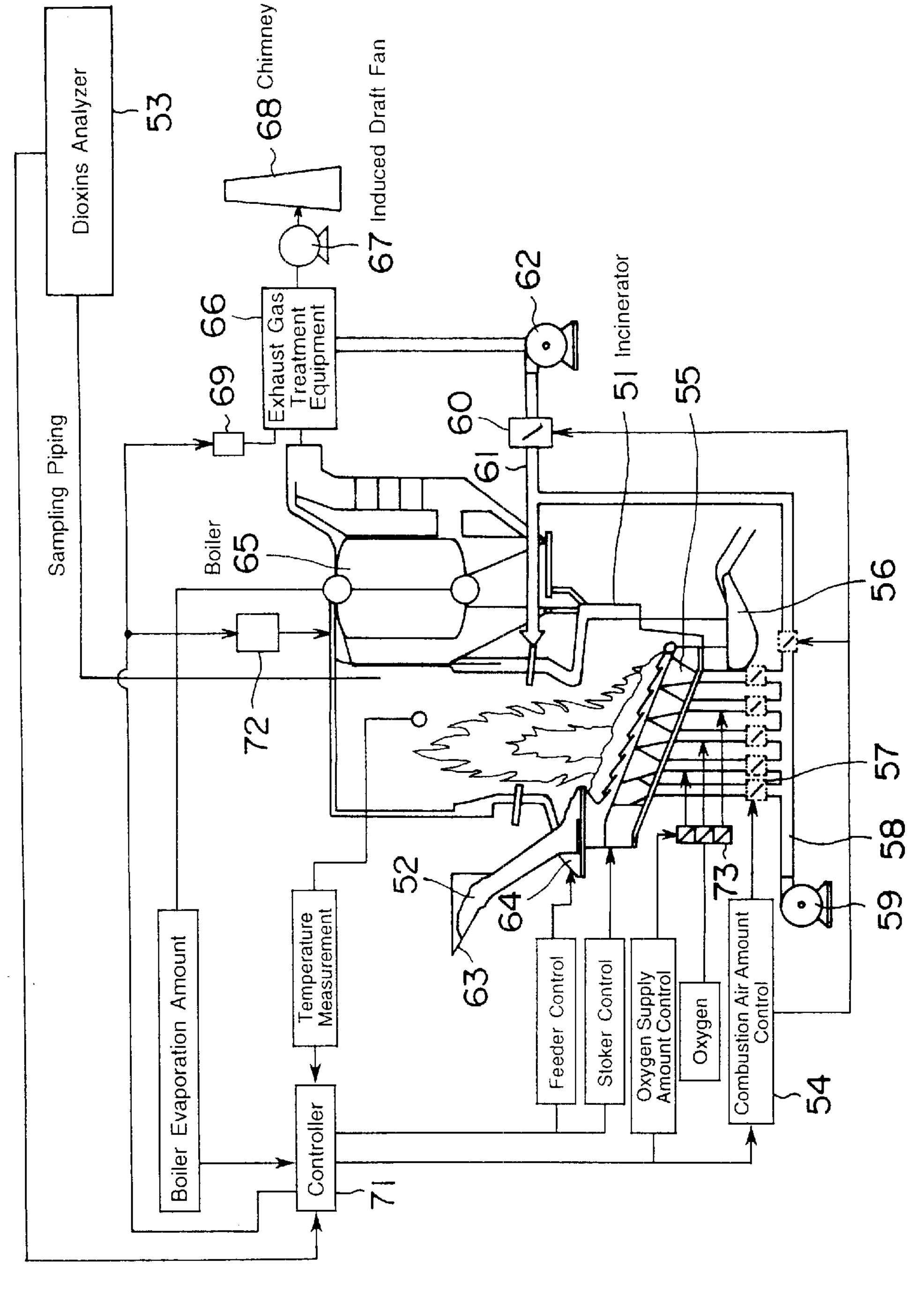
FIG. 12 is a schematic view of a combustion control system.

FIG. 12 is a schematic view of a combustion control system. As shown in FIG. 12, the control system of the present embodiment is a combustion control system in an incinerator for charging a combustible material 52 into a furnace 51 such as an incinerator, a thermal decomposition furnace, or a melting furnace, maintaining the amount of heat generated by combustion at a constant level, and suppressing occurrence of a hazardous gas containing dioxins. This control system comprises a dioxins analyzer 53 capable of instantaneously measuring the dioxins in the furnace 51, and combustion air control means 54, whereby the concentration of the dioxins is detected without a time delay, and the amount of combustion air is varied according to the concentration of the dioxins detected. In the present embodiment, the incinerator 51 is a fluidized bed kiln having a fluidized bed 55 at its bottom. Downstream from the fluidized bed 55, an ash chute 56 is disposed for transporting ash after combustion of the combustible material 52 to a predetermined position. To the fluidized bed 55, a forced draft fan 59 is connected via piping 58 having a primary combustion air amount control valve 57 interposed therein. Primary combustion air is fed to an arbitrary site from a lower portion of the fluidized bed 55. Near the lower portion of the fluidized bed kiln 51, a forced draft fan 62 is connected via piping 61 having a secondary combustion air amount control valve 60 interposed therein. Secondary combustion air acts to burn a combustion gas, which has been generated by primary combustion, at an upper site in the fluidized bed kiln 51. On a side wall of the lower portion of the fluidized bed kiln 51, a combustible material feed hopper 63 is provided for charging a combustible material, such as a municipal solid waste, into the fluidized bed 55. At a lower portion of the hopper 63, a feeder 64 is provided which is driven by a motor to push the combustible material 52 out into the fluidized bed 55. The combustible material 52 fed by the feeder 64 is gasified in the fluidized bed 55, and burned in the interior of the fluidized bed kiln 51 above the fluidized bed 55. Above the fluidized bed kiln 51, there are sequentially connected a boiler 65 for cooling a high temperature combustion gas obtained by combustion in the fluidized bed kiln 51, exhaust gas treatment equipment 66 for removing a hazardous gas and particulate matter, an induced draft fan 67 for sucking the exhaust gas, and a chimney 68 for releasing the exhaust gas into the atmosphere. Near the exhaust gas treatment equipment 66, a sprayer 69 is disposed for spraying calcium hydroxide, activated carbon, etc. into the equipment 66 where necessary. Above the fluidized bed kiln 51, the dioxins analyzer 53 is provided as measuring means capable of instantaneously measuring the concentration of dioxins in the combustion gas in the furnace. This analyzer 53 has a structure as shown in FIG. 1 or 11, and the measured information is electrically connected to a controller 71. The controller 71 is electrically connected to the primary combustion air amount control valve 57, the secondary combustion air amount control valve 60, an oxygen amount regulating valve 73, and a stabilizing burner 72.

Combustion control may be performed by performing, as required, primary combustion air amount control, or secondary combustion air amount control, control of the oxygen concentration in combustion air, or any of these types of control. If the controller 71 has built-in predicting control means, the controller 71 can predict changes in the dioxins concentration from time series data based on the results of measurements by the dioxins analyzer 53. The predicting control means has a fuzzy controller for control of the baseline (mean value), and a chaotic controller for suppressing the occurrence of dioxins. The chaotic controller predicts the dioxins concentration at a certain time in the future, from time series data based on the results of measurements by the dioxins analyzer 53, and if it predicts the occurrence of a peak, it calculates a manipulated variable for increasing the secondary combustion air amount. The fuzzy controller grasps the deviation between the results of measurement of the exhaust gas and the set value for the dioxins concentration, and calculates a manipulated variable for reducing the deviation to zero. Based on the sum of the manipulated variable determined by the chaotic controller and the manipulated variable by the fuzzy controller, the primary combustion air amount control valve 57 and the secondary combustion air amount control valve 60 are operated to control the dioxins concentration of the plant.

An example of a combustion control operation using the chaos theory by the combustion control system of the foregoing constitution will be described below. However, combustion control of the invention is not restricted thereto.

The combustible material 52, such as a municipal solid waste, is charged from the combustible material feed hopper 63 into the fluidized bed 55 of the fluidized bed kiln 51. The combustible material charged is gasified in the fluidized bed 55, and burned inside the fluidized bed kiln 51. The resulting exhaust gas is cooled by the boiler 65, and rid of a hazardous gas and particulate matter by the exhaust gas treatment equipment 66 such as a filtering dust collector. Then, the treated gas is sucked by the induced draft fan 67, and released from the chimney 68 into the atmosphere. Above the fluidized bed kiln 51, the dioxins concentration is instantaneously measured by the dioxins analyzer 53, and signals based on the results of measurements are sent to a predicting controller (not shown). The predicting controller predicts changes in the dioxins concentration according to the chaos theory. Signals by the predicting controller are sent to the controller 71, which adjusts the openings of the primary combustion air amount control valve 57 and the secondary combustion air amount control valve 60, thereby adjusting the amounts of primary combustion air and secondary combustion air.

As described above, the dioxins analyzer 53 is attached to the upper portion of the fluidized bed kiln 51 to measure the concentration of dioxins in the combustion gas in the furnace in real time. Based on the time series data on this concentration, changes in the concentration of carbon monoxide are predicted by the predicting controller using the chaos theory. Based on the prediction, the amounts of primary combustion air and secondary combustion air in the lower portion of the fluidized bed kiln 51 are adjusted. Thus, the peak of the dioxins concentration can be suppressed to a predetermined value or less, and the amount of dioxins generated can be reduced.

The dioxins concentration at the exit of the furnace which will be newly installed is targeted at 0.5 ng-TEQ/$Nm^3$, and it will become necessary to measure this concentration. The concentrations of monochlorobenzene (a precursor of dioxins) and dibenzofuran pentachloride ($P_5CDF$) corresponding to the dioxins concentration of 0.1 ng-TEQ/$Nm^3$ are 20 ng/$Nm^3$ and 0.5 ng/$Nm^3$, respectively. These concentrations can be detected by use of the apparatus of the invention.

Figure 13:
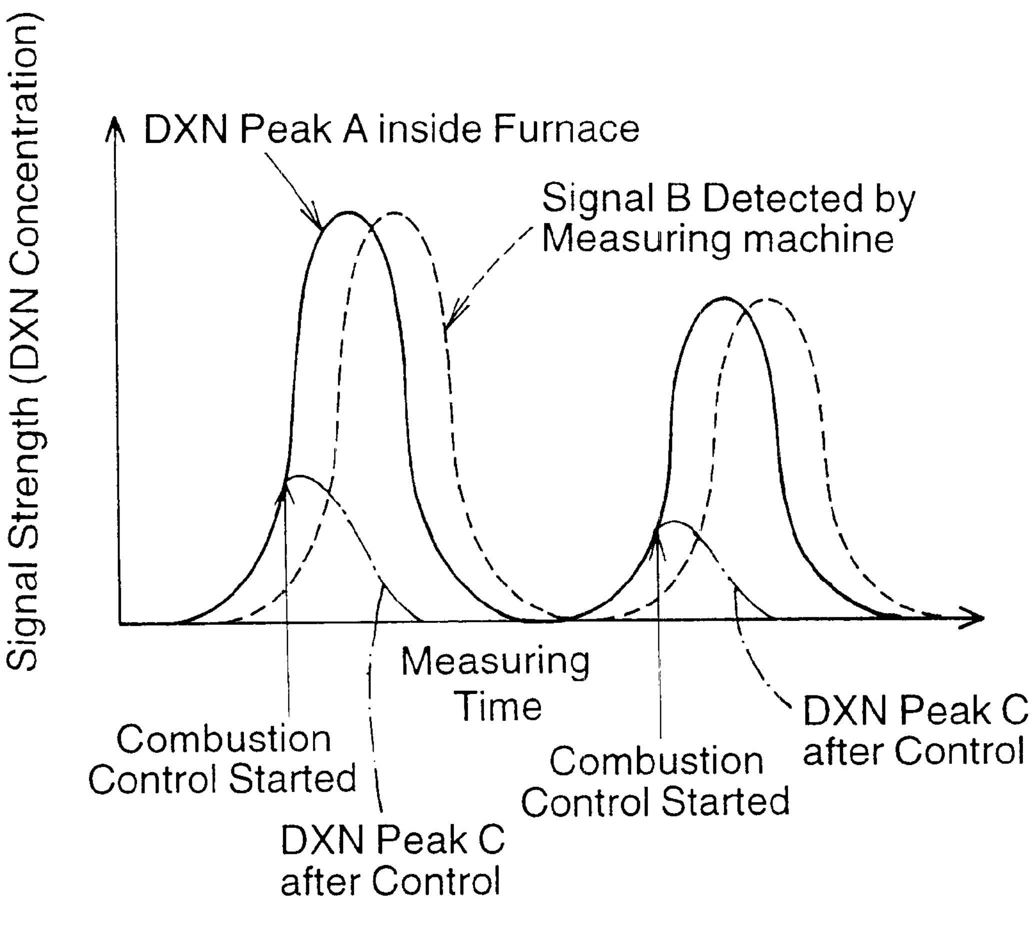
FIG. 13 is a view showing the states before and after combustion control.
Figure 14:
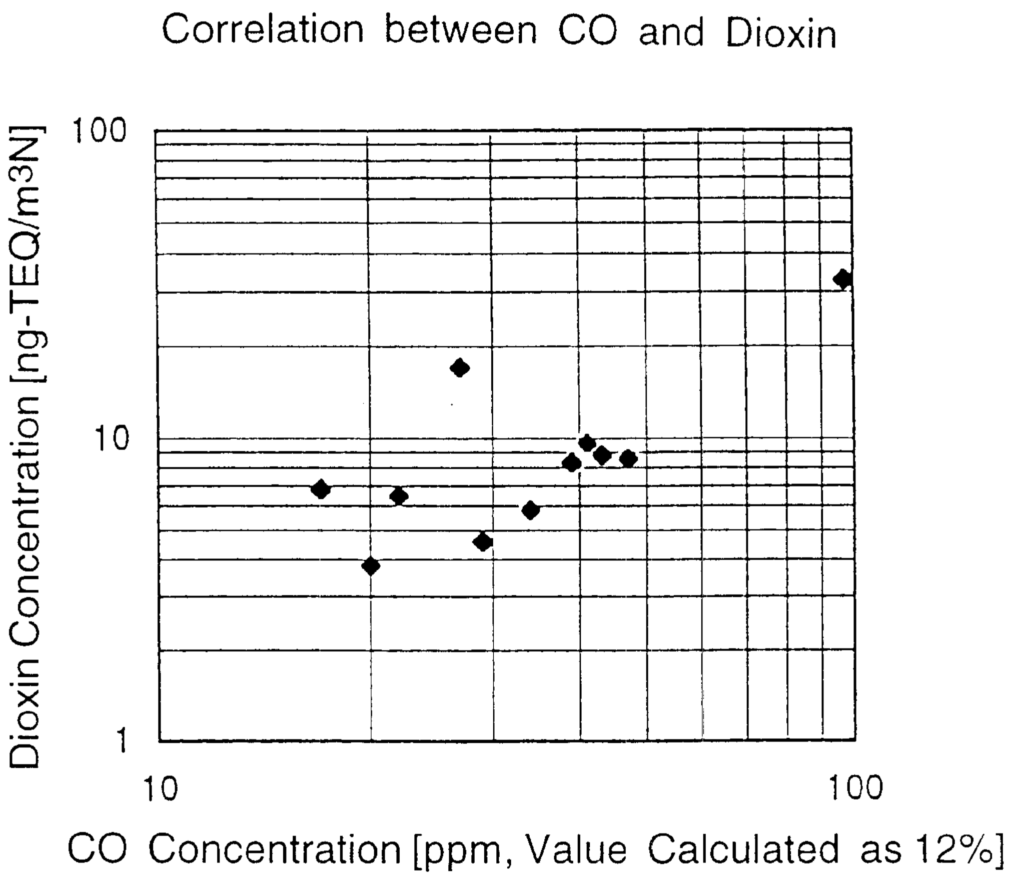
FIG. 14 is a view showing the correlation between the concentration of CO and the concentration of dioxins.

The use of the dioxins analyzer of the invention makes possible the real-time detection of the dioxins concentration in the furnace and the exhaust gas flue with a time delay of about 5 to 20 seconds. Accordingly, as shown in FIG. 13, measurement is made in a manner in which a signal B of detection by the measuring machine follows a peak A of the dioxins (DXN) in the furnace. Hence, when the aforementioned control is performed immediately after finding that the concentration of dioxins has increased, a peak C representing the control of occurrence of dioxins is detected.

The location of sampling of the exhaust gas is not a restricted location in the furnace as stated above, but may be set, where necessary, in the flue from the furnace to the boiler 65, or in the flue from the boiler 65 to the exhaust gas treatment equipment 66. Particularly by installing the dioxins analyzer 53 between the boiler 65 and the exhaust gas treatment equipment 66, it can be judged that if no dioxins occur in the furnace, dioxins have occurred downstream from the furnace because of resynthesis of dioxins precursors. In this case, activated carbon, an adsorbent, is sprayed from the sprayer 69, whereby dioxins in the exhaust gas can be adsorbed, and their discharge to the outside can be prevented. Instead of spraying activated carbon, the stabilizing burner 72, subsidiary combustion means, may be installed in the flue, whereby dioxins generated can be burned.

Next, an apparatus and a method for analysis of dioxins in a solution such as waste water will be described with reference to FIG. 15.

Figure 15:
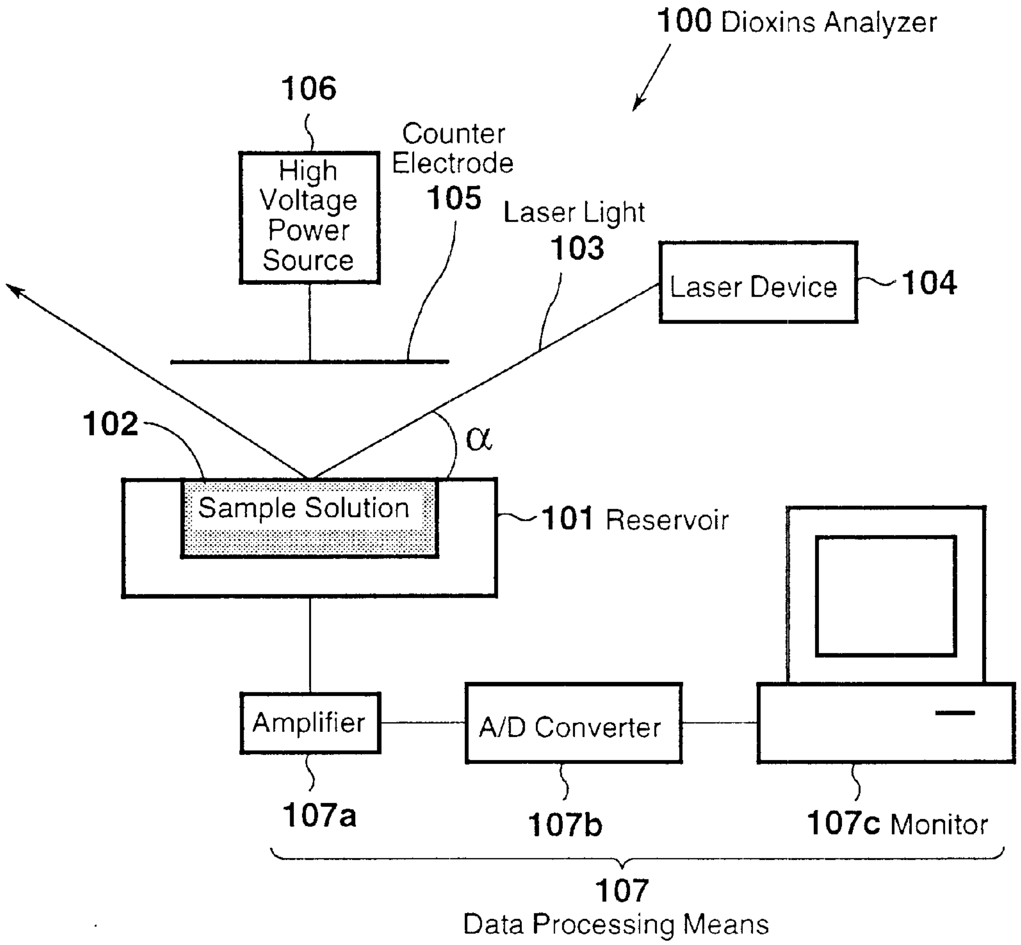
FIG. 15 is a schematic view of a dioxins analyzer for analyzing dioxins in a solution.

As shown in FIG. 15, a dioxins analyzer 100 according to the present embodiment comprises a laser device 104 for applying laser light 103 to a surface of a solution 102, which is to be measured, in a reservoir 101; a counter electrode 105 provided opposite the surface of the solution 102, which is to be measured, in the reservoir 101; a high voltage power source 106 for applying a high voltage between the counter electrode 105 and the reservoir 101; and data processing means 107 composed of an amplifier 107*a* for amplifying an electric current signal obtained, an A/D converter 107*b* for converting an analog signal of the amplifier into a digital signal, and a monitor 107*c* for image processing the signal. Using this analyzer 100, laser light 103 is applied to the surface of the solution 102 to be measured to carry out laser multiphoton ionization of dioxins on the surface, and the concentration of dioxins in the solution being measured is determined.

According to the invention, the concentration of dioxins in the waste water can be detected to up to a low level of the order of pg/liter. Thus, the concentration of dioxins in the waste water can be analyzed rapidly, without requiring an analysis time of about 72 hours as in the conventional extraction method for measurement of the dioxins concentration in the waste water.

The incidence angle ($\alpha$) of the laser light applied to the surface of the solution being measured is preferably 15 degrees or less for the following reasons: At the laser light incidence angle (α) of 15 degrees or less, most of the laser light is reflected, and does not enter into the solution 102 being measured. Thus, ionization takes place preferentially only on the surface of the solution.

According to the present measurement, dioxins on the surface of the solution are analyzed, and the concentration of dioxins inside the solution is not directly measured. However, a satisfactory calibration curve can be drawn using a sample from the solution whose inside dioxins concentration has been progressively varied. Hence, it can be judged that the concentration can be determined even upon ionization on the solution surface. When ionization is performed inside the solution, the measurement tends to be affected by water, the solvent. Under these circumstances, the ionization method carried out near the surface of the solution, as in the invention, is sufficiently feasible, because it permits adjustment of an increase or a decrease in the amount of hydroxyl radicals generated by a dioxins decomposition device in a waste water treatment system to be described later on.

The laser light is nanosecond ($10^{-9}$ second) or several hundred femtosecond ($10^{-13}$ second) laser light. The wavelength of the laser light is a fixed wavelength in a range of 240 to 300 nm.

An example of a waste water treatment system for decomposing difficultly decomposable substances in waste water with the use of the above analyzer will be described.

Figure 16:
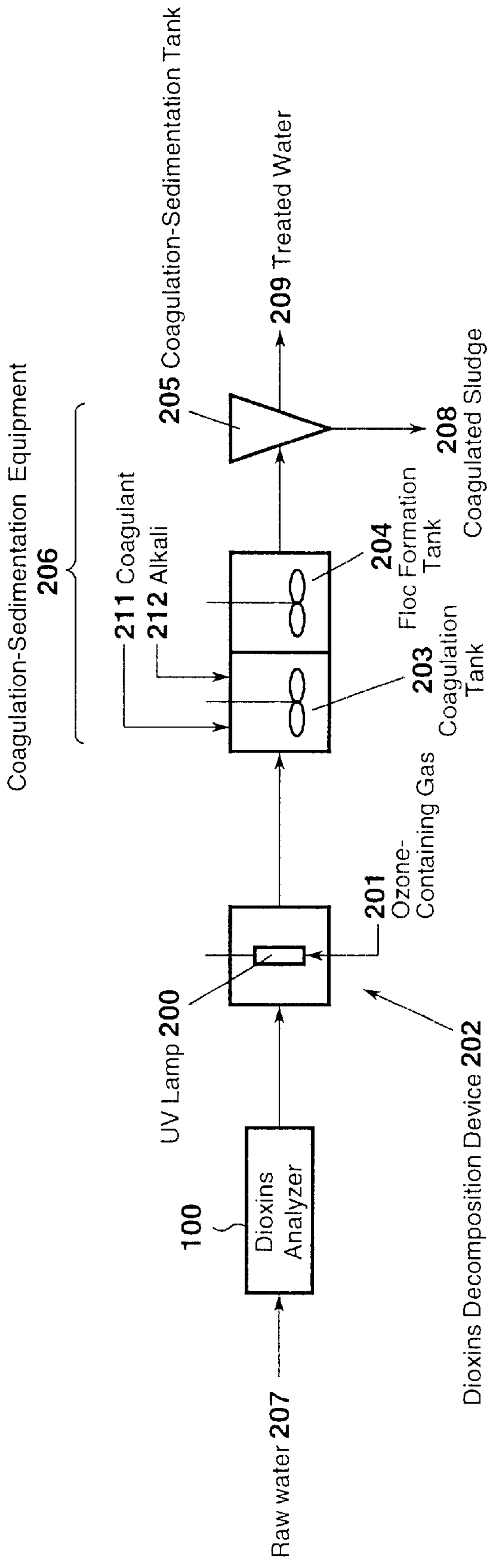
FIG. 16 is a schematic view of a waste water treatment system for decomposing difficultly decomposable substances in waste water.

As shown in FIG. 16, the waste water treatment system according to the present embodiment comprises the dioxins analyzer 100 of FIG. 15 capable of measuring the concentration of dioxins in waste water; a dioxins decomposition device 202 accommodating an ultraviolet lamp 200 for applying ultraviolet radiation (UV) and adapted to introduce an ozone-containing gas 201 and generate hydroxyl (OH) radicals; and coagulation-sedimentation equipment 206 including a coagulation tank 203, a floc formation tank 204, and a coagulation-sedimentation tank 205. According to this system, the concentration of dioxins is detected by the dioxins analyzer 100 without a time delay. The amount of hydroxyl radicals generated is adjusted according to the detected concentration of the dioxins. The dioxins in waste water (raw water) 207 containing hazardous substances, such as dioxins, are decomposed by the dioxins decomposition device 202 using such hydroxyl radicals. Then, suspended matter is coagulated and sedimented in the coagulation-sedimentation equipment 206, whereafter a coagulated sludge 208 is separated for purification, to form treated water 209.

According to the foregoing constitution, the dioxins decomposing power can be adjusted according to the current status of the contents of hazardous substances, such as dioxins, in the raw water 207. As a result, efficient decomposition of the raw water becomes possible. When the dioxins concentration in the raw water 207 has exceeded a certain value (e.g., 20 to 30 pg/liter), an ozone-containing gas and hydrogen peroxide can be supplied to initiate the decomposition of dioxins. This regulatory value is not restrictive, but may be changed according to the effluent standards. Consequently, it is unnecessary to generate hydroxyl radicals for decomposition of dioxins constantly in waste water treatment as done with the conventional system. Thus, the treating efficiency of the treatment system can be raised, and an energy saving in the treatment equipment can be achieved.

The coagulation-sedimentation equipment 206 is designed to add a coagulant 211 and an alkali (e.g., NaOH)

212 to the raw water 207, and coagulate and sediment solid matter and a colloid in the coagulation-sedimentation tank 205, followed by removing them. The alkali is added to adjust the pH which has lowered in the coagulation reaction. Depending on the required quality of treated water, means such as sand filtration means or activated carbon adsorption means may be further added after the coagulation-sedimentation facilities.

The above-described dioxins decomposition device 202 adopts a decomposition method in which hydroxyl (OH) radicals are generated by the joint use of hydrogen peroxide ($H_2O_2$) and ozone to decompose dioxins completely with the hydroxyl radicals until no harm is found.

According to the present embodiment, the combination of hydrogen peroxide ($H_2O_2$) and ozone has been illustrated as an example of the hydroxyl radical generating means. Other examples of the generating means are ① irradiation of ozone with ultraviolet rays by an ultraviolet lamp, ② irradiation of a combination of ozone and hydrogen peroxide with ultraviolet rays by an ultraviolet lamp, and ③ irradiation of hydrogen peroxide with ultraviolet rays by an ultraviolet lamp. The method ①, irradiation of ozone with ultraviolet rays by an ultraviolet lamp (e.g., a low pressure mercury lamp: output 10 to 200 W), involves irradiating ozone (ozone concentration 10 g/m$^3$ or more) with ultraviolet radiation having wavelengths of 185 nm and 254 nm to generate hydroxyl radicals. The method ②, using the combination of ozone and hydrogen peroxide, injects hydrogen peroxide in an amount of 10 to 5,000 mg/liter and ozone in an amount of 50 to 5,000 mg/liter, and irradiates them with ultraviolet rays by an ultraviolet lamp to generate hydroxyl radicals. The method ③, irradiation of hydrogen peroxide with ultraviolet rays by an ultraviolet lamp, injects hydrogen peroxide in an amount of 10 to 5,000 mg/liter, and irradiates it with ultraviolet rays by an ultraviolet lamp to generate hydroxyl radicals. Furthermore, the dioxins decomposition device may be integrated with the coagulation-sedimentation equipment 206 to achieve a compact size.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A dioxins analyzer for applying laser light to a gas or solution containing dioxins to perform laser multiphoton ionization of the dioxins, and then measuring the ionized dioxins, comprising:

sampling means for directly sampling a combustion gas containing dioxins in an exhaust gas discharged from an incinerator, a thermal decomposition furnace, or a melting furnace;

ejection means for ejecting the sampled gas containing the dioxins into a vacuum chamber with use of a nozzle having a pulse valve for forming a supersonic jet;

laser applicator means for applying laser light of a broad spectral width into the ejected supersonic jet to form molecular ions of homologues of the dioxins during a resonance enhanced ionization process; and a time-of-flight mass spectrometer for analyzing the resulting molecular ions for dioxins, wherein:

the homologues of the dioxins in the combustion gas are directly analyzed;

the ejection means has a pulse valve for ejecting the sampled gas in a direction coaxial with a flying direction of the ions; and the laser light is applied from a direction perpendicular to the jet ejected from the pulse valve.

2. The dioxins analyzer of claim 1, wherein:

the laser light of the broad spectral width is laser light of a pulse width shorter than a life in an electron excited state of molecules to be measured.

3. The dioxins analyzer of claim 1, wherein:

the laser light is femtosecond laser light of 2 to 500 femtoseconds.

4. The dioxins analyzer of claim 1, wherein:

the wavelength of the laser light is a fixed wavelength in a range of 240 to 350 nm.

5. The dioxins analyzer of claim 1, wherein:

the nozzle of the ejection means is a slit nozzle.

6. The dioxins analyzer of claim 1, wherein:

the sampling means is a sampling pipe equipped with a filter for removing ash in the exhaust gas.

7. The dioxins analyzer of claim 1, wherein:

the sampling means includes backwashing means.

8. The dioxins analyzer of claim 1, wherein:

a front end of the sampling means is provided in at least one location inside the incinerator, thermal decomposition furnace or melting furnace, or inside an exhaust gas flue.

9. The dioxins analyzer of claim 1, wherein:

the time-of-flight mass spectrometer is a reflectron type mass spectrometer.

10. A dioxins analysis method, comprising:

multiphoton ionizing dioxins in an exhaust gas or waste water solution with use of laser light comprising:

directly sampling a combustion gas containing dioxins in the exhaust gas, the exhaust gas being discharged from an incinerator, a thermal decomposition furnace, or a melting furnace;

ejecting the sampled gas containing the dioxins into a vacuum chamber in a direction coaxial with a flying direction of ions of the dioxins with use of a nozzle having a pulse valve for forming a supersonic jet; and applying laser light of a broad spectral width into the ejected supersonic jet from a direction perpendicular to the ejected jet to form molecular ions of homologues of the dioxins during a resonance enhanced ionization process; and directly analyzing homologues of the dioxins simultaneously.

11. The dioxins analysis method of claim 10, wherein:

the laser light of the broad spectral width is femtosecond laser light of 2 to 500 femtoseconds.

12. A dioxins analysis method, comprising:

multiphoton ionizing dioxins in a waste water solution with use of laser light, the waste water being discharged from an incinerator, a thermal decomposition furnace, or a melting furnace; and analyzing homologues of the dioxins simultaneously, wherein said multiphoton ionizing step comprises:

applying laser light to a surface of said waste water solution to be measured to perform laser multiphoton ionization of dioxins on the surface; and determining a concentration of the dioxins in the solution being measured.

13. The dioxins analysis method of claim 12, wherein:

the laser light is nanosecond laser light or femtosecond laser light.

14. The dioxins analysis method of claim 12, wherein:

the laser light is laser light of a wavelength of 300 nm or less.

15. A dioxins analyzer for applying laser light to a gas or solution containing dioxins to perform laser multiphoton ionization of the dioxins, and then measuring the ionized dioxins, comprising:

a laser device for applying laser light to a surface of a solution, which is to be measured, in a reservoir;

a counter electrode provided opposite the surface of the solution, which is to be measured, in the reservoir;

a high voltage power source for applying a high voltage between the counter electrode and the reservoir; and a processor for amplifying and processing an electric current signal obtained.

16. The dioxins analyzer of claim 15, wherein:

an incidence angle of the laser light applied to the surface of the solution to be measured is 15 degrees or less.

17. The dioxins analyzer of claim 16, wherein:

the laser light is nanosecond laser light or femtosecond laser light.

18. The dioxins analyzer of claim 16, wherein:

the wavelength of the laser light is a fixed wavelength in a range of 240 to 300 nm.

19. A waste water treatment system for decomposing difficultly decomposable substances in waste water, including:

the dioxins analyzer of claim 15 capable of measuring a concentration of dioxins in the waste water, and wherein:

the concentration of the dioxins is detected without a time delay, and the dioxins in the waste water are decomposed in the presence of hydroxyl radicals according to the detected concentration of the dioxins.

* * * * *